US006523632B1

(12) United States Patent
Hanaoka et al.

(10) Patent No.: US 6,523,632 B1
(45) Date of Patent: *Feb. 25, 2003

(54) VEHICLE EQUIPPED WITH TURNING MECHANISM

(75) Inventors: Tadashi Hanaoka, Wako (JP); Yoshimitsu Ishida, Wako (JP); Masaru Katayama, Wako (JP); Yasuto Shigematsu, Wako (JP); Yoshito Hamasaki, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/616,366

(22) Filed: Jul. 13, 2000

(30) Foreign Application Priority Data

Jul. 15, 1999 (JP) .......................................... 11-201452
Oct. 15, 1999 (JP) .......................................... 11-294369

(51) Int. Cl.$^7$ ............................................ B60K 17/356
(52) U.S. Cl. ...................... 180/236; 180/242; 180/253; 180/411
(58) Field of Search ................................ 180/236, 234, 180/244, 245, 243, 253, 411, 415, 408, 414, 252, 242, 6.48, 6.5, 409; 280/91.1, 99, 103

(56) References Cited

U.S. PATENT DOCUMENTS

| 5,154,437 A | * | 10/1992 | Inagaki et al. ............... 180/234 |
| 5,199,523 A | * | 4/1993 | Abe et al. ................... 280/91.1 |
| 5,213,143 A | * | 5/1993 | Policky et al. ............... 180/236 |
| 5,295,554 A | * | 3/1994 | Cullen ........................ 180/236 |
| 5,722,504 A | * | 3/1998 | Gaetani ....................... 180/411 |
| 6,125,963 A | * | 10/2000 | Staiger ........................ 180/411 |
| 6,378,641 B1 | * | 4/2002 | Hanaoka et al. ............. 180/204 |

* cited by examiner

Primary Examiner—Anne Marie Boehler
(74) Attorney, Agent, or Firm—Armstrong, Westerman & Hattori, LLP

(57) ABSTRACT

A vehicle capable of turning a vehicle body with a relatively small turning radius and with a good operability in a turning operation. One of front and rear pairs of left and right wheels, to which a running torque produced by a vehicle driving source is not transmitted, is arranged for rotation concerning respective axes perpendicular to the ground. For turning the vehicle body, the one pair of left and right wheels are fixed at angular positions along tangential directions of an arc which passes the axes perpendicular to the ground of the one pair of left and right wheels. At these angular positions, a rotating torque is applied to the one pair of left and right wheels to turn the vehicle body substantially about the center point of the rotating axle for running the vehicle of the other pair of left and right wheels.

18 Claims, 24 Drawing Sheets

VEHICLE EQUIPPED WITH TURNING MECHANISM

BACKGROUND OF THE INVENTION

1. Field of the Invention

The present invention relates to a vehicle which can turn with a smaller turning radius.

2. Description of the Related Art

For four-wheel vehicles, a parameter called the "turning radius" is known for indicating the performance of each four-wheel vehicle. A vehicle having a smaller turning radius can make a smaller turn at a corner during a turning operation such as U-turn.

Vehicles employing four-wheel steering (4WS) have been known as prior art four-wheel vehicles which can improve the turning radius. The 4WS refers to a system which controls the steering angle (rudder angle) of not only front wheels but also rear wheels in association with a manipulation through a steering wheel. The 4WS system can reduce the turning radius due to the controllable steering angle provided to the rear wheels.

A fifth wheel system is also known as an improvement in the turning radius. The fifth wheel system additionally has a fifth wheel stored below the floor, in addition to four wheels, such that the fifth wheel is slightly protruded relative to the other wheels during a turn to lift up the vehicle body, and the fifth wheel is driven to have the vehicle make a turn.

However, the 4WS, while it is effective in reducing the turning radius, suffers from limitations to the reduction in the turning radius because the steering angle is limited in order to suppress an inherent shake-out phenomenon to a practically ignorable extent. The fifth wheel system in turn is expected to provide significant effects, but implies a problem that the vehicle becomes unstable due to a three-wheel state during a turning operation.

Moreover, because a vehicle turning operation which reduces the turning radius requires actuation of a turning mechanism which cannot be used during a normal running operation such as straight traveling and backward traveling, the vehicle presents another problem in that it has only limited operation states in which the vehicle can be turned with stability.

In addition, a vehicle, when equipped with such a turning mechanism, has been desired to provide improved operability during a turning operation.

SUMMARY OF THE INVENTION

It is therefore an object of the present invention to provide a vehicle which is capable of turning a vehicle body with a relatively small turning radius and a good operability during a turning operation.

A vehicle equipped with a turning mechanism according to the present invention comprises rotatably supporting means for supporting one of front and rear pairs of left and right wheels, to which a running torque produced by a driving source is not transmitted, for rotation concerning respective axes perpendicular to the ground; rotating position fixing means for fixing the one pair of left and right wheels at respective angular positions along tangential directions of an arc passing the respective axes perpendicular to the ground of the one pair of left and right wheels, and having the center located near a center point of a rotating axle for running the vehicle of the other of the front and rear pairs of left and right wheels; and turn driving means for applying a rotating torque to the one pair of left and right wheels at the angular positions fixed by the rotating position fixing means to turn a vehicle body on a neighborhood of the center point of the rotating axle for running the vehicle of the other pair of left and right wheels.

According to the vehicle of the present invention described above, because one of the front and rear pairs of left and right wheels, to which a running torque produced by the driving source is not transmitted, are supported for rotation concerning respective axes perpendicular to the ground, and the one pair of left and right wheels are fixed at the respective angular positions along the tangential directions of the arc passing the respective axes perpendicular to the ground of the one pair of left and right wheels, with the center of the arc located near the center point of the rotating axle for running the vehicle of the other of the front and rear pairs of left and right wheels, it is possible to provide a relatively simple and small turning mechanism. In addition, because the radius of the arc passing the axes of the one pair of left and right wheels perpendicular to the ground and having the center near the center point of the rotating axle of the other pair of left and right wheels is the turning radius when the vehicle is turned, the turning radius is extremely small.

Another vehicle equipped with a turning mechanism according to the present invention comprises steering means rotatably arranged for steering the vehicle; detecting means for detecting a manipulating state of the steering means; mode selecting means for selecting one of a normal mode for running the vehicle and a turn mode for turning a vehicle body while the vehicle stops running; steering control means for changing a steering angle of a steering wheel of the vehicle in accordance with a result of detection by the detecting means when the mode selecting means selects the normal mode; and turning means for turning the vehicle body on a neighborhood of the center point of an axle extending between a front or rear pair of left and right wheels of the vehicle in response to a result of detection by the detecting means, without allowing the steering control means to change the steering angle of the steering wheel in accordance with a result of detection by the detecting means when the mode selecting means selects the turn mode.

According to the vehicle of the present invention described above, the vehicle body is turned on a point near the center point of the rotating axle of the front or rear left and right wheels of the vehicle, thereby making it possible to turn the vehicle body with a relatively small turning radius. In addition, the steering means such as the steering wheel for use in the normal mode for running the vehicle is also used in the turn mode to perform the turning operation, the operability can be improved during the turning operation. Furthermore, the utilization of the steering means for the turning operation can reduce the cost as compared with a manipulating device such as a switch which would be newly provided for the turning operation.

The turning means includes rotatably supporting means for supporting one of front and rear pairs of left and right wheels, to which a running torque produced by a driving source is not transmitted, for rotation concerning respective axes perpendicular to the ground; determining means for determining whether a vehicle operating state satisfies predetermined conditions when the turn mode is selected; and rotation driving means, when the determining means determines that the predetermined conditions are satisfied, for rotating the one pair of left and right wheels from straight traveling positions taken when the vehicle is running to respective angular positions along tangential directions of an arc passing the respective axes perpendicular to the ground of the one pair of left and right wheels, the arc having the center located near a center point of a rotating axle of the other of the front and rear pairs of left and right wheels.

According to the vehicle described above, because one of the front and rear pairs of left and right wheels, to which a running torque produced by a driving source is not transmitted, are supported for rotation concerning the respective axes perpendicular to the ground, and the one pair of left and right wheels are rotated from the straight traveling positions taken when the vehicle is running to the respective angular positions along the tangential direction of the arc passing the respective axes perpendicular to the ground of the one pair of left and right wheels, with the center of the arc located near the center point of the rotating axle of the other of the front and rear pairs of left and right wheels, it is possible to provide a relatively simple and small turning mechanism. In addition, since he one pair of left and right wheels will not be rotated from the straight traveling positions taken when the vehicle is running to the respective angular positions along the tangential directions for a turning operation unless the vehicle operating state satisfies the predetermined conditions suitable for a turn in the turn mode, the turning operation can be performed while the vehicle is in a stable state.

The turn driving means turns the vehicle body over an angular distance corresponding to the rotating direction and the rotating angle of the steering means detected by the detecting means. According to this configuration, the vehicle body is turned in a direction in which the driver rotates the steering means, causing the vehicle to turn over an angular distance corresponding to a rotating angle determined by the driver, thereby making it easy to turn the vehicle body to a desired position in a turning operation with an extremely favorable operability resulting therefrom.

In the configuration described above, the turn driving means turns the vehicle body at a speed corresponding to the rotating direction and the rotating angle of the steering means detected by the detecting means. According to this configuration, the vehicle body is turned in a direction in which the driver rotates the steering means, causing the vehicle to turn at a speed corresponding to a rotating angle determined by the driver, so that the vehicle body is smoothly turned in a turning operation with an extremely favorable operability.

The predetermined conditions include at least the following conditions:

(a) the vehicle stops running; and (b) the steering angle of the front wheels is substantially zero degrees.

By defining the predetermined conditions as mentioned, it is possible to confirm whether or not the vehicle is in a state from which the vehicle can transition without any problem to a vehicle body turning operation for which the one pair of left and right wheels are driven to rotate.

The condition defining that the vehicle stops running is detected from a shift position of a transmission equipped in the vehicle lying in a P (parking) position or an N (neutral) position, or a side brake being in operation. According to this configuration, it is possible to detect that the vehicle is not merely temporarily stopped, thereby preventing the vehicle from running forward or backward during a turning operation.

Also, the vehicle further comprises a shift lock mechanism for disabling the transmission to perform a shifting operation when at least the one pair of left and right wheels are at positions other than the straight traveling positions. According to this configuration, since the vehicle is disabled to travel straight by the shift lock mechanism when the one pair of left and right wheels are at the angular positions rotated from the straight traveling positions for turning the vehicle body, it is possible to prevent erroneous manipulations by the driver.

The turn driving means applies the rotating torque to the one pair of left and right wheels with a driving source different from the driving source to turn the vehicle body. According to this configuration, unlike a normal driving source for running, a driving source capable of producing a minimally required driving force is sufficient, so that a smaller driving source can be driven for the turning operation in order to save the space.

The rotatably supporting means includes a trailing arm for rotatably supporting the one pair of left and right wheels through knuckles at the respective axes perpendicular to the ground of the one pair of left and right wheels. According to this configuration, since the rotatably supporting means is formed of existing suspension members, neither dedicated parts nor members are required for use in implementing the rotatably supporting means, thereby making it possible to reduce the cost.

The turn driving means includes braking means for applying a braking force to rotations of the one pair of left and right wheels in response to a manipulation on a switch arranged in the steering wheel. According to this configuration, the driver can stop turning the vehicle body by manipulating the switch while holding the steering wheel.

Further, the turn driving means includes braking means for applying a braking force to rotations of the one pair of left and right wheels in response to the driver stepping on a brake pedal. With this configuration, the driver can stop turning the vehicle body by stepping on the brake pedal in a manner similar to in the normal mode, thereby making it possible to readily stop turning the vehicle body at a desired position.

The turning means further includes rotatably supporting means for supporting one of front and rear pairs of left and right wheels, to which a running torque produced by a driving source is not transmitted, for rotation concerning respective axes perpendicular to the ground; determining means for determining whether a vehicle operating state satisfies predetermined conditions when the turn mode is selected; rotation driving means, when the determining means determines that the predetermined conditions are satisfied, for rotating the one pair of left and right wheels from straight traveling positions taken when the vehicle is running to respective angular positions along tangential directions of an arc passing the axes perpendicular to the ground of the one pair of left and right wheels, the arc having the center located near a center point of a rotating axle of the other of the front and rear pairs of left and right wheels; and turn driving means for applying rotating torques in rotating directions different from each other to the left and right wheels of the other pair at the angular positions along the tangential directions in accordance with a result of detection by the detecting means to turn the vehicle body on a neighborhood of the center point of the rotating axle of the other pair of left and right wheels.

According to the turning means configured as described above, one of front and rear pairs of left and right wheels, to which a running torque produced by the driving source is not transmitted, are supported for rotation concerning the respective axes perpendicular to the ground, and the one pair of left and right wheels are rotated from the straight traveling positions taken when the vehicle is running to the respective angular positions along the tangential directions of the arc passing the respective axes perpendicular to the ground of the one pair of left and right wheels, with the center of the arc located near the center point of the rotating axle of the other of the front and rear pairs of left and right wheels, thereby making it possible to provide a relatively simple and small turning mechanism. In addition, since the one pair of left and right wheels will not be rotated from the straight traveling positions taken when the vehicle is running to the respective angular positions along the tangential directions for a turning operation unless the vehicle operating state satisfies the predetermined conditions suitable for a turn in the turn mode, the turning operation can be performed while the vehicle is in a stable state. Further, since the rotating torques are applied to the left and right wheels of the other pair at the angular positions along the tangential directions to turn the vehicle body on a neighborhood of the center point of the rotating axle of the other pair of left and right wheels, the turning radius is extremely small when the vehicle is turned.

The turn driving means applies the rotating torques in rotating directions different from each other to the respective left and right wheels of the other pair with a driving source different from the driving source to turn the vehicle. According to this configuration, like the aforementioned case, a driving source capable of producing a minimally required driving force is sufficient unlike a normal driving source for running, so that a smaller driving source can be driven for the turning operation in order to save the space.

The turn driving means further includes means for fixing a case for rotatably supporting two pinions arranged in a differential during a turning operation of the vehicle body, and a motor for driving one of side gears arranged in the differential. According to this configuration, since a differential function, i.e., rotation of the one driving axle with the case of the differential maintained fixed causes the other driving axle to reversely rotate, can be effectively utilized, a diving force for turning the vehicle body can be provided only by adding a minimally required function.

DETAILED DESCRIPTION OF THE PREFERRED EMBODIMENTS

Embodiments of the present invention will hereinafter be described in detail with reference to the accompanying drawings.

Figure 1:
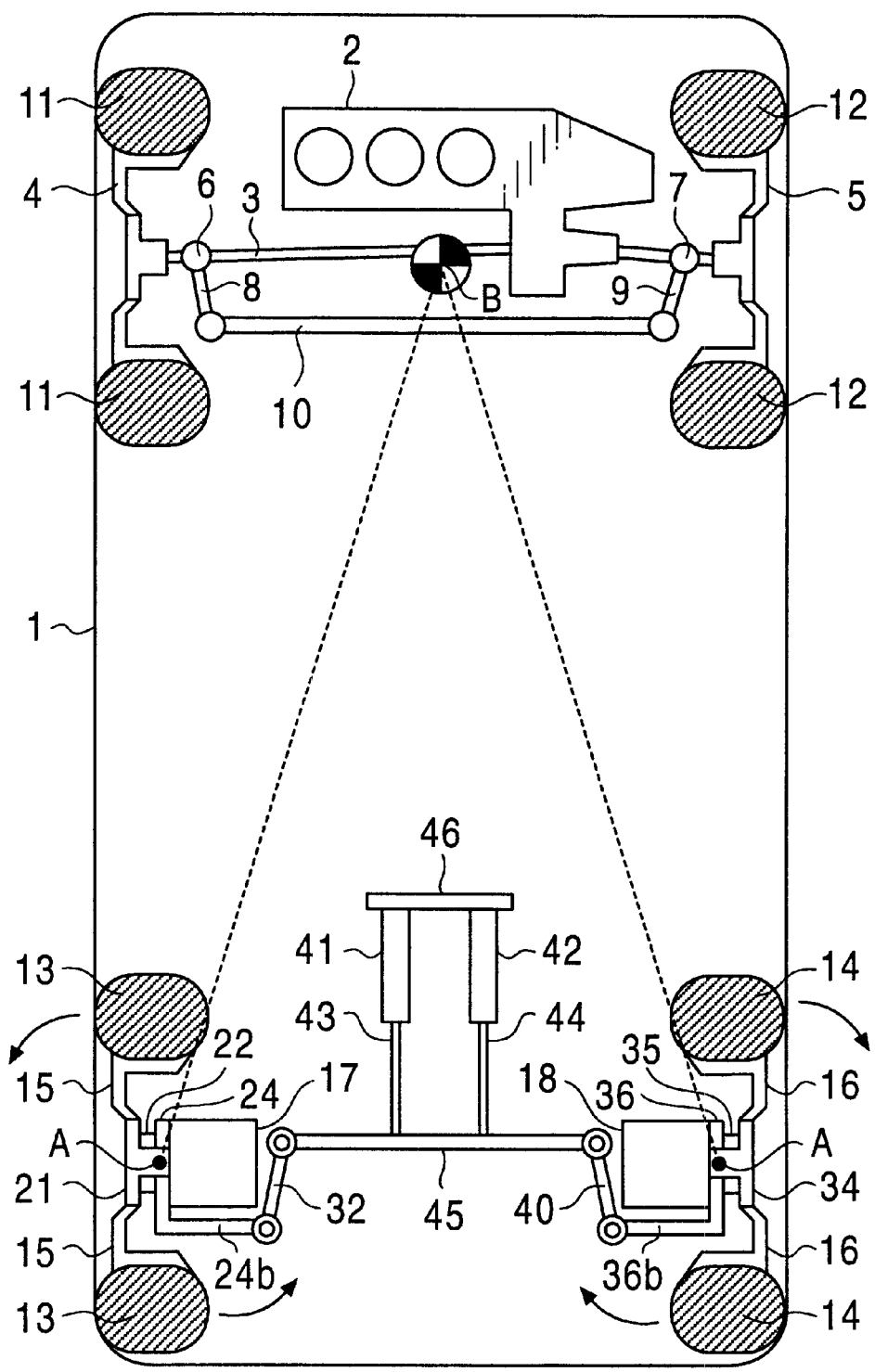
FIG. 1 is a diagram generally illustrating the structure of a four-wheel vehicle as an embodiment of the present invention.

FIG. 1 illustrates the general structure of a four-wheel vehicle equipped with a turning mechanism according to the present invention, viewed from a horizontal plane including the cross-sections of four front and rear tires 11–14 of the vehicle. The illustrated vehicle is a front wheel driven (FF) vehicle which has an engine body 2 positioned in a front portion of a vehicle body 1 to drive front wheels 4, 5 on the left and right sides to rotate through a driving axle 3. Front wheels 4, 5 inside the left and right front tires 11, 12 are coupled to a steering mechanism composed of knuckles 6, 7, knuckle arms 8, 9, and a tie rod 10.

Left and right rear wheels 15, 16 inside left and right rear tires 13, 14 in turn are rotatably arranged. Each of the rear wheels 15, 16 is coupled to a motor 17 or 18, such that the rear wheels 15, 16 are driven by the respective motors 17, 18 for rotation. The motors 17, 18, which function as driving sources for turning the vehicle body 1, are forwardly rotated when the vehicle body 1 is turned to the left, and are reversely rotated when the vehicle body 1 is turned to the right.

Figure 2:
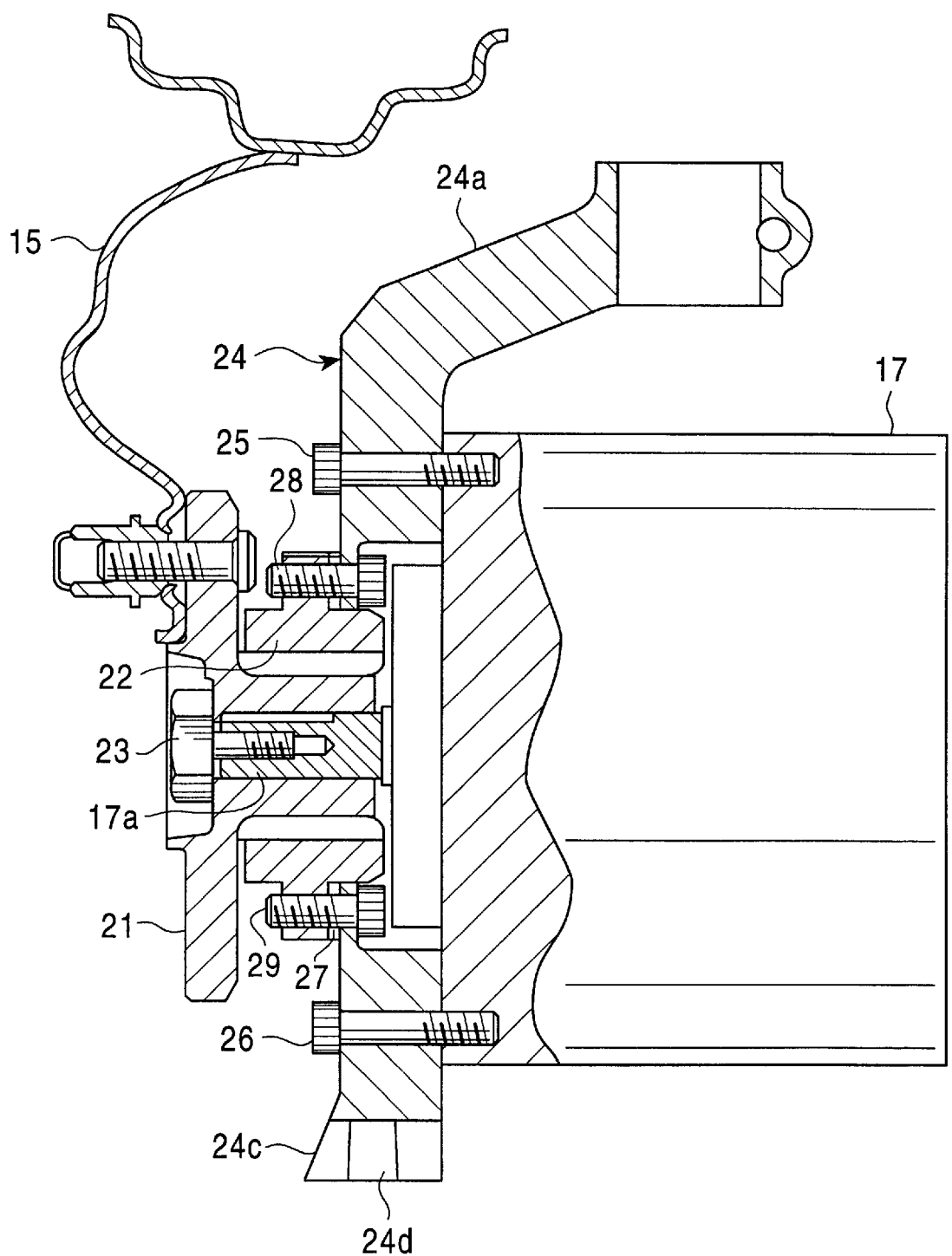
FIG. 2 is a cross-sectional view illustrating specifically a feature associated with a rear wheel.
Figure 3:
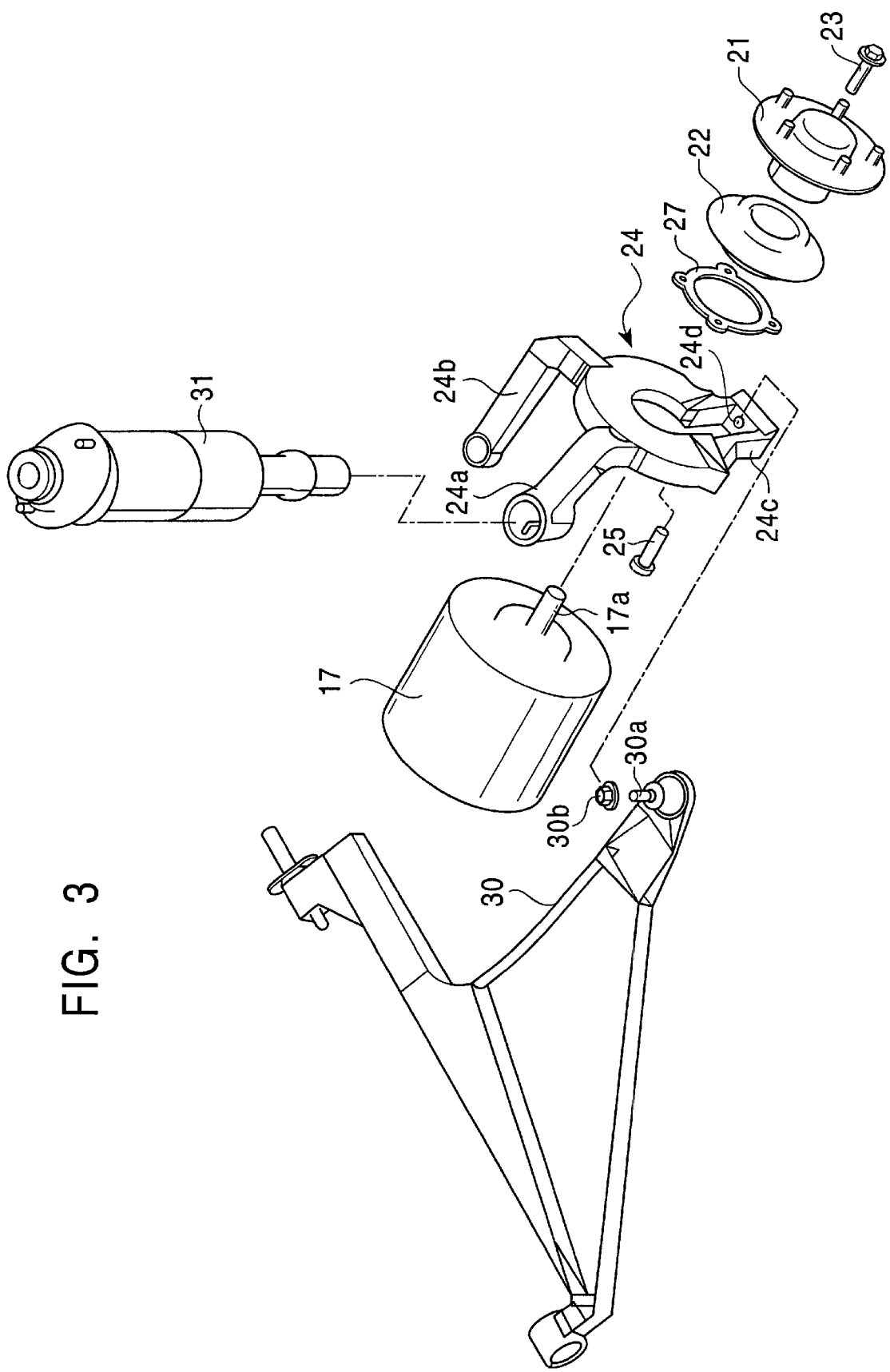
FIG. 3 is an assembling diagram illustrating the feature associated with the rear wheel of FIG. 2.

A flange-shaped hub 21 is arranged at the center of the rear wheel 15, and the hub 21 is rotatably supported by a bearing 22, as specifically illustrated in FIGS. 2 and 3. A rotating shaft 17a of the motor 17 is inserted into a central axial hole of the hub 21 from the inside, and a bolt 23 is screwed into the rotating shaft 17a from the outside of the hub 21 to couple the hub 21 and the rotating shaft 17a of the motor 17. The motor 17 is secured to a ring-shaped knuckle 24 on a protruding surface of the rotating shaft 17a with bolts 25, 26. As can be seen in FIG. 3, the knuckle 24 has a lower portion cut away from the ring shape thereof, which serves as a support 24c pivotally coupled to a screw 30a of a trailing arm 30. More specifically, the screw 30a of the trailing arm 30 is inserted into a throughhole 24d of the support 24c from below, and the screw 30a is screwed into a nut 30b. This pivotal coupling of the trailing arm 30 to the knuckle 24 enables the rear wheel 15 to pivotally move on an axis perpendicular to the ground.

Also, a bearing 22 is secured to the knuckle 24 through a washer 27 with bolts 28, 29. The knuckle 24 has two knuckle arms 24a, 24b extending from the outer periphery thereof, with a shock absorber 31 coupled to the leading end of the knuckle arm 24a. The knuckle arm 24b, which is formed in L-shape, is coupled to one end of a connecting arm 32 which forms part of a turning mechanism. The connecting arm 32 is arranged for two-dimensional pivotal movements about the coupling point.

It will be understood that while FIGS. 2 and 3 illustrate only the feature associated with the coupling of the left rear wheel 15 and the motor 17, a feature associated with the coupling of the right rear wheel 16 and the motor 18 is formed symmetric to the feature associated with the coupling of the left rear wheel 15.

Figure 4:
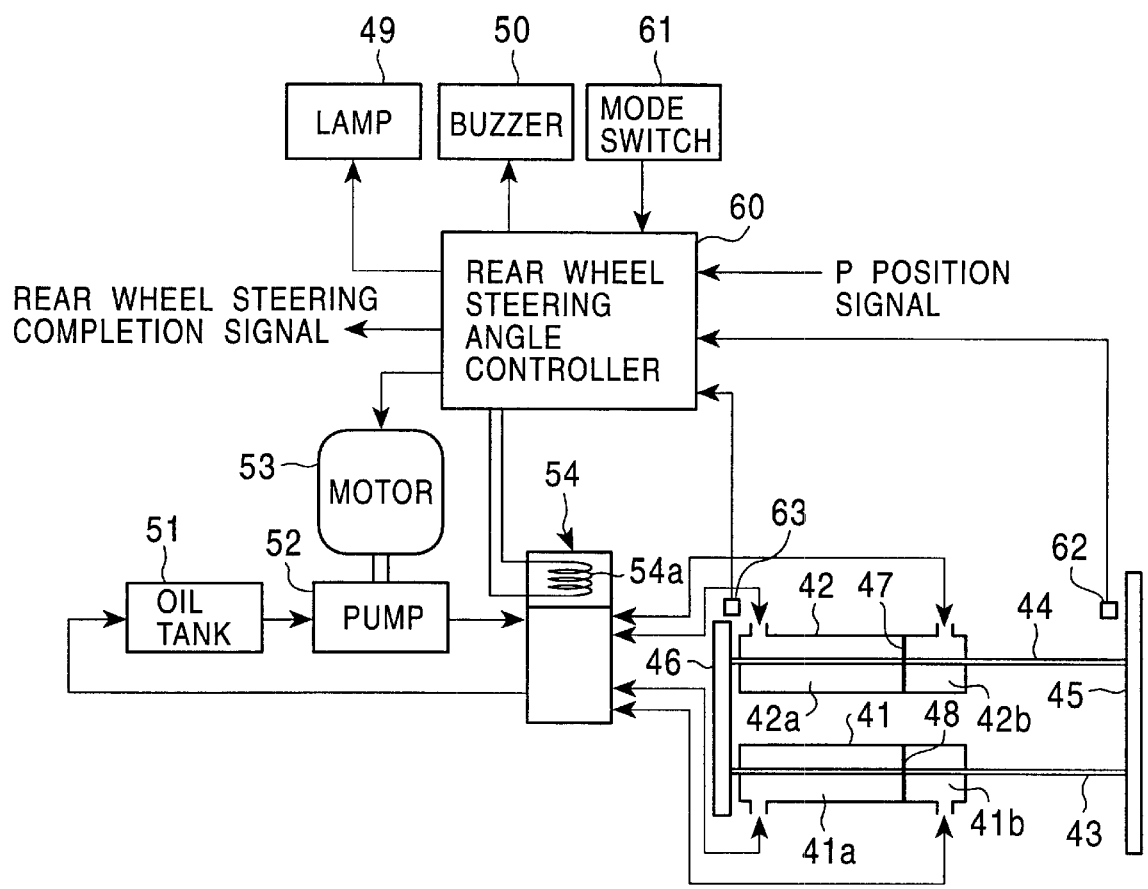
FIG. 4 is a block diagram illustrating a rear wheel steering system including a hydraulic circuit and an electrical circuit.

As illustrated in FIG. 1, the turning mechanism comprises a right connecting arm 40, two hydraulic cylinders 41, 42, two rods 43, 44, and two rims 45, 46 in addition to the above-mentioned left connecting arm 32. The hydraulic cylinders 41, 42 are fixed to the vehicle body 1 in parallel with each other such that pistons 47, 48 arranged therein are slidable in the longitudinal direction of the vehicle body 1, as illustrated in FIG. 4 later described. The rods 43, 44 extend through the corresponding hydraulic cylinders 41, 42. The rims 45, 46 are bar-shaped members which serve as stoppers. The rim 45 has one end coupled to the other end of the connecting arm 32 for two-dimensional pivotal movements and the other end similarly coupled to the other end of the connecting arm 40 for two-dimensional pivotal movements. The rims 45, 46 are arranged in parallel with each other, with the rods 43, 44 interposed therebetween. Each of the rods 43, 44 has one end secured to the rim 45, and the other end secured to the rim 46. The rods 43, 44 are coupled to and extend through the pistons 47, 48 in the hydraulic cylinders 41, 42, respectively, so that the rods 43, 44 are associated with movements of the pistons 47, 48.

The hydraulic cylinders 41, 42 are formed with oil chambers 41a, 41b, 42a, 42b, respectively, on both sides thereof divided by the respective pistons 47, 48, and each of the oil chambers is formed with oil inlet and outlet.

In a normal mode, the pistons 47, 48 are positioned on the rear side of the vehicle within the hydraulic cylinders 41, 42 by a rear wheel steering system, later described, forcing the rear tires 13, 14 to be set in a straight traveling attitude in association with that positioning. In a turn mode, the pistons 47, 48 are positioned on the front side of the vehicle within the hydraulic cylinders 41, 42 by the rear wheel steering system, forcing the rear tires 13, 14 to be set in an internally inclined attitude, as will be later described, in association with that positioning.

FIG. 4 illustrates the rear wheel steering system including a hydraulic circuit and an electrical circuit for the hydraulic cylinders 41, 42. The hydraulic circuit has an oil tank 51, a hydraulic pump 52, a motor 53, and an electromagnetic valve 54. The motor 53 is provided for driving the hydraulic pump 52. Oil within the oil tank 51 is discharged by the hydraulic pump 52 and supplied to the electromagnetic valve 54. The electromagnetic valve 54 has an oil inlet from the pump 52 and an oil outlet to the oil tank 51. The electromagnetic valve 54 also has four ports individually connected to the respective oil chambers 41a, 41b, 42a, 42b of the hydraulic cylinders 41, 42. The electromagnetic valve 54 is operated to switch the hydraulic circuit such that the oil inlet is internally in oil communication with two ports from the oil chambers 41a, 42a, while the oil outlet is in oil communication with two ports from the oil chambers 41b, 42b, when a solenoid 54a of the electromagnetic valve 54 is in a non-excited state, and the oil inlet is internally in oil communication with two ports from the oil chambers 41b, 42b, while the oil outlet is in oil communication with the two ports from the oil chambers 41a, 42a when the solenoid 54a of the electromagnetic valve 54 is in an excited state. It should be noted that pipe lines arranged between the oil tank 51, the hydraulic pump 52, the electromagnetic valve 54, and the hydraulic cylinders 41, 42 are simply indicated by solid lines and not designated by reference numerals in FIG. 4.

A rear wheel steering angle controller 60 controls the driving of the motor 53, and switches the solenoid 54a of the electromagnetic valve 54 between the excited and non-excited states. The rear wheel steering angle controller 60 comprises a microcomputer which operates in accordance with an associated program. The rear wheel steering angle controller 60 is connected to a mode switch 61 which is manipulated by the driver to instruct the turn mode, and rim sensors 62, 63 for detecting the positions of the rims 45, 46, respectively. The rim sensor 62 generates a turn position signal when the rim 45 is at a position close to the hydraulic cylinders 41, 42, while the rim sensor 63 generates a straight traveling position signal when the rim 46 is at a position close to the hydraulic cylinders 41, 42. In addition, the rear wheel steering angle controller 60 is connected to a lamp 49 and a buzzer 50, so that the lamp 49 blinks or lights in the turn mode, and the buzzer 50 generates intermittent or continuous alarming sound in the turn mode. Further, the rear wheel steering angle controller 60 is supplied with a P position signal indicating that a shift position of a transmission (not shown) of the vehicle is in a P (parking) position.

Each of the motors 17, 18 is applied with a supply voltage, a normal/reverse rotation signal indicative of a rotating direction, a speed signal for specifying a rotational speed, a brake signal for instructing a braking operation, and a reset signal for prohibiting a turn. The supply voltage and respective signals are controlled individually by a turn controller 70.

Figure 5:
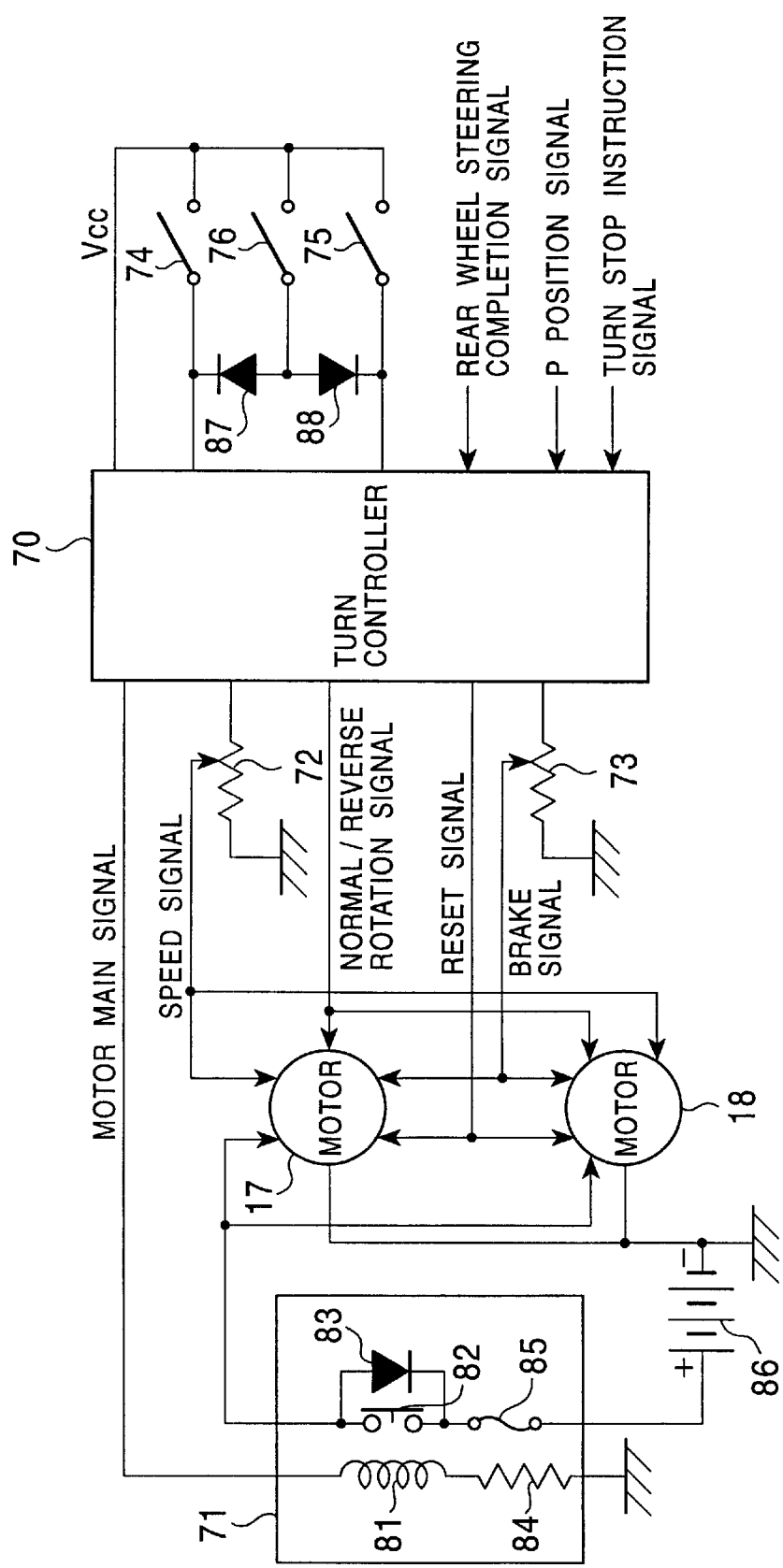
FIG. 5 is a circuit diagram illustrating a driving control system.

FIG. 5 illustrates a driving control system for the motors 17, 18. The driving control system comprises, in addition to the turn controller 70, a relay unit 71, a speed adjusting volume 72, a brake adjusting volume 73, left and right turn switches 74, 75, and a brake switch 76. The turn controller 70 is based on a microcomputer. The left and right turn switches 74, 75 and the brake switch 76 are switches which turn ON only when they are manipulated.

The relay unit 71 comprises a relay coil 81, a relay switch 82, a diode 83, a resistor 84, and a fuse 85. The relay coil 81 and the resistor 84 are connected in series, and arranged such that the relay coil 81 is excited as the relay coil 81 and the resistor 84 are supplied with a motor main signal output from the turn controller 70. The relay switch 82 and the diode 83 are connected in parallel to form a parallel circuit which has one end connected to a positive terminal of a buttery 86, which serves as a power supply, through the fuse 85, and the other end connected to a positive input terminal of a voltage source for the motors 17, 18. The voltage source for the motors 17, 18 has its negative terminal connected to a negative terminal of the battery 86 for grounding.

The normal/reverse rotation signal, the speed signal, the brake signal and the reset signal are generated from the turn controller 70. The normal/reverse rotation signal and the reset signal are supplied as they are to the motors 17, 18. The speed signal is supplied to the motors 17, 18 through a speed adjusting volume 72, while the brake signal is supplied to the motors 17, 18 through the brake adjusting volume 73. The speed adjusting volume 72 and the brake adjusting volume 73 adjust the level of the speed signal and the level of the brake signal in response to manipulations made thereon, respectively.

Each of the left and right turn switches 74, 75 and the brake switch 76 has one end applied with a voltage Vcc corresponding to a high level, while each of the left and right turn switches 74, 75 has the other end connected to the turn controller 70. The brake switch 76 has the other end connected to the other ends of the left and right turn switches 74, 75, respectively, with diodes 87, 88 interposed therebetween. The diodes 87, 88 are arranged to set the other ends of the respective left and right turn switches 74, 75 to high level when the brake switch 76 is ON.

The turn controller 70 is supplied with a steering completion signal indicative of the completion of turn steering angle control from the rear wheel steering angle controller 60 as well as supplied with the P position signal.

Figure 6:
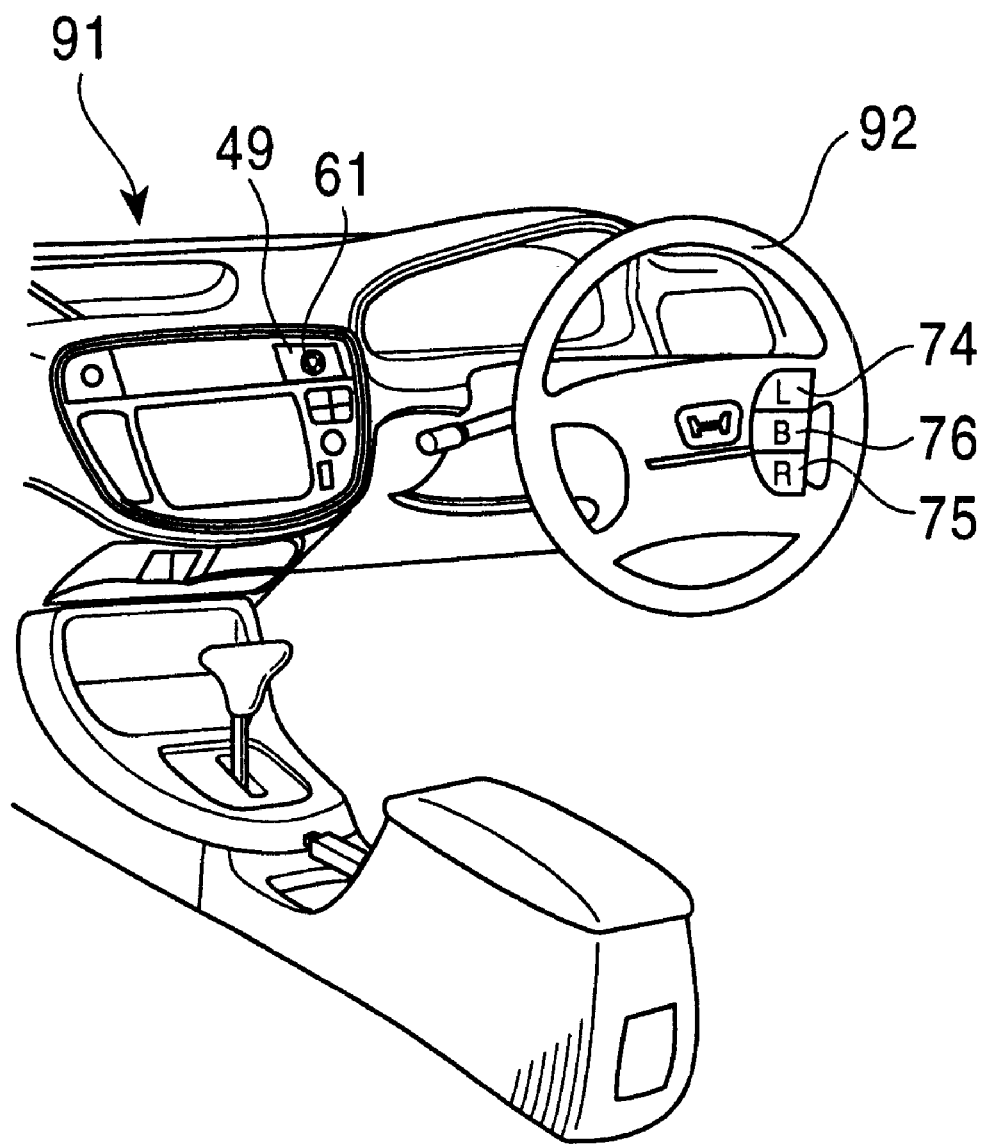
FIG. 6 is a diagram illustrating where switches and lamps shown in FIGS. 4 and 5 are disposed within the vehicle.

FIG. 6 illustrates positions at which the mode switch 61, the turn switches 74, 75, and the brake switch 76 are disposed within the vehicle. The mode switch 61 is located in a central portion of a front panel 91, while the turn switches 74, 75 and the brake switch 76 are arranged integral with a steering wheel 92. Also, around the mode switch 61, a lighting or blinking display is provided by the lamp 49.

Next, the operation of the foregoing turning mechanism will be described in accordance with associated programs processed by the rear wheel steering controller 60 and the turn controller 70. The rear wheel steering angle controller 60 executes a rear wheel steering routine, while the turn controller 70 executes a turn control routine.

Figure 7:
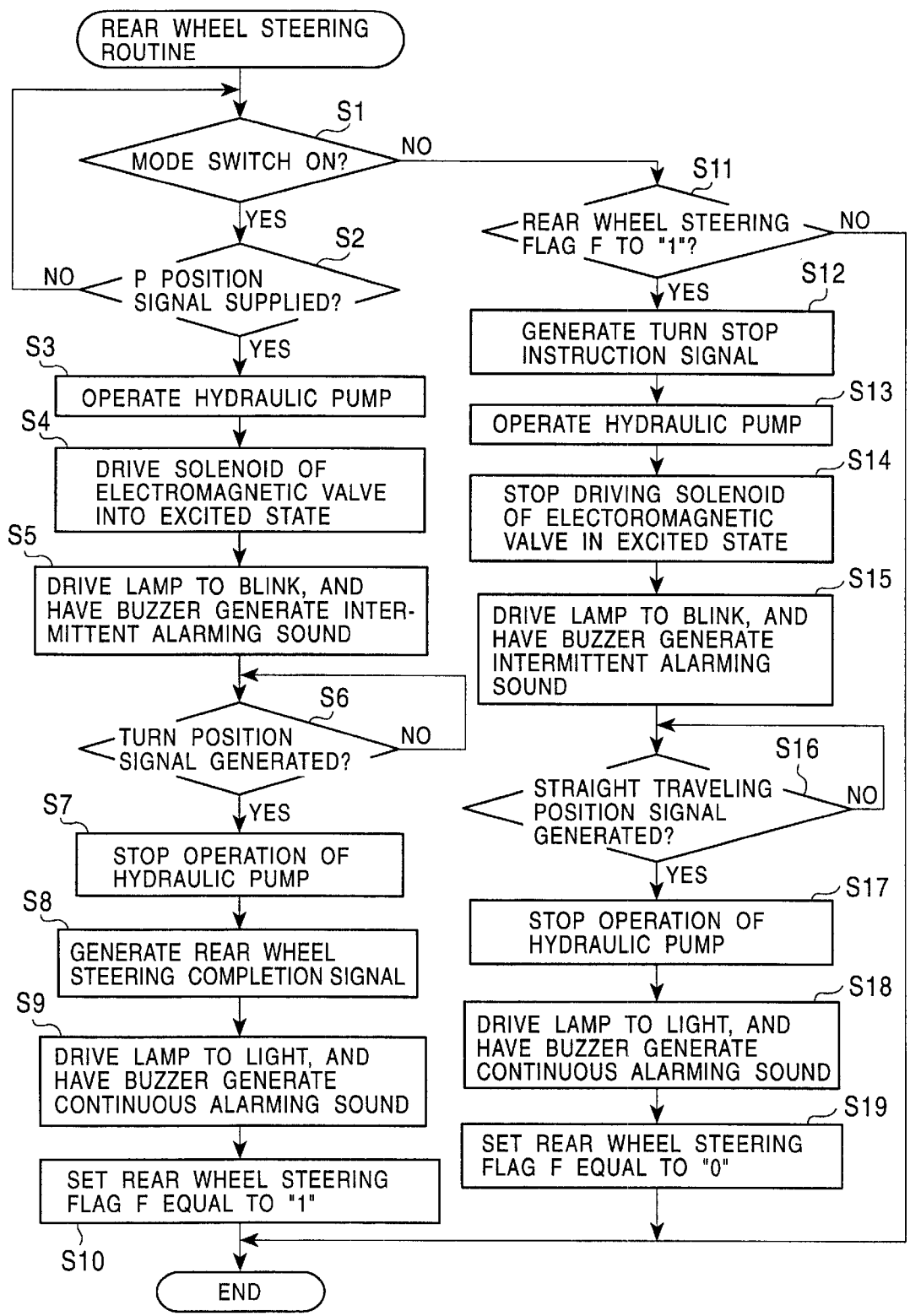
FIG. 7 is a flow chart illustrating a rear wheel steering routine.

First, in the rear wheel steering routine as illustrated in FIG. 7, the rear wheel steering angle controller 60 determines whether or not the mode switch 61 is ON (step S1). As the mode switch 61 is turned ON, the rear wheel steering angle controller 60 determines whether or not the P position signal has been supplied thereto (step S2). The step S2 is provided for determining whether or not the vehicle is stopped. As the shift position of the transmission is in the P position when the P position signal has been supplied, this means that the turn steering angle control can be initiated.

After executing step S2, the rear wheel steering angle controller 60 drives the motor 53 to operate the hydraulic pump 52 (step S3), and drives the solenoid 54a of the electromagnetic valve 54 into an excited state (step S4). In addition, the rear wheel steering angle controller 60 drives the lamp 49 to blink, and has the buzzer 50 generate intermittent alarming sound (step S5). The execution of steps S3 and S4 causes the hydraulic pump 52 to discharge oil within the oil tank 51, which is supplied to the oil chambers 41b, 42b in the respective hydraulic cylinders 41, 42 through the electromagnetic valve 54. On the other hand, the oil chambers 41a, 42a in the respective oil cylinders 41, 42 communicate with the oil tank 51 through the electromagnetic valve 54, so that the oil within the oil chambers 41a, 42a returns to the oil tank 51 through the electromagnetic valve 54. Thus, the oil discharged from the oil tank 51 by the hydraulic pump 52 is supplied to the oil chambers 41b, 42b and acts to increase the volumes of the oil chambers 41b, 42b and therefore presses the pistons 47, 48 toward the oil chambers 41a, 42a. As the pistons 47, 48 are moved toward the oil chambers 41a, 42a, the rods 43, 44 and the rims 45, 46 are moved toward the front of the vehicle, associated with the movements of the pistons 47, 48.

As the rim 45 is moved toward the front of the vehicle, the left and right knuckle arms 24b, 36b are pulled toward the front of the vehicle through the left and right connecting arms 32, 40, causing pivotal movements of the left and right rear wheels 15, 16 concerning supporting shafts (indicated by reference letters A in FIG. 1) of the knuckles 24, 36 in a direction indicated by arrows shown in FIG. 1. More specifically, the movement of the rim 45 causes pivotal movements of the rear tires 13, 14, the motors 17, 18, the knuckles 24, 36, and portions coupled to the rotating shafts 17a, 18a of the motors 17, 18 as well as the rear wheels 15, 16.

During the pivotal movements of the left and right wheels 15, 16, the lamp 49 is driven to blink, while the buzzer 50 generates intermittent alarming sound.

Figure 8:
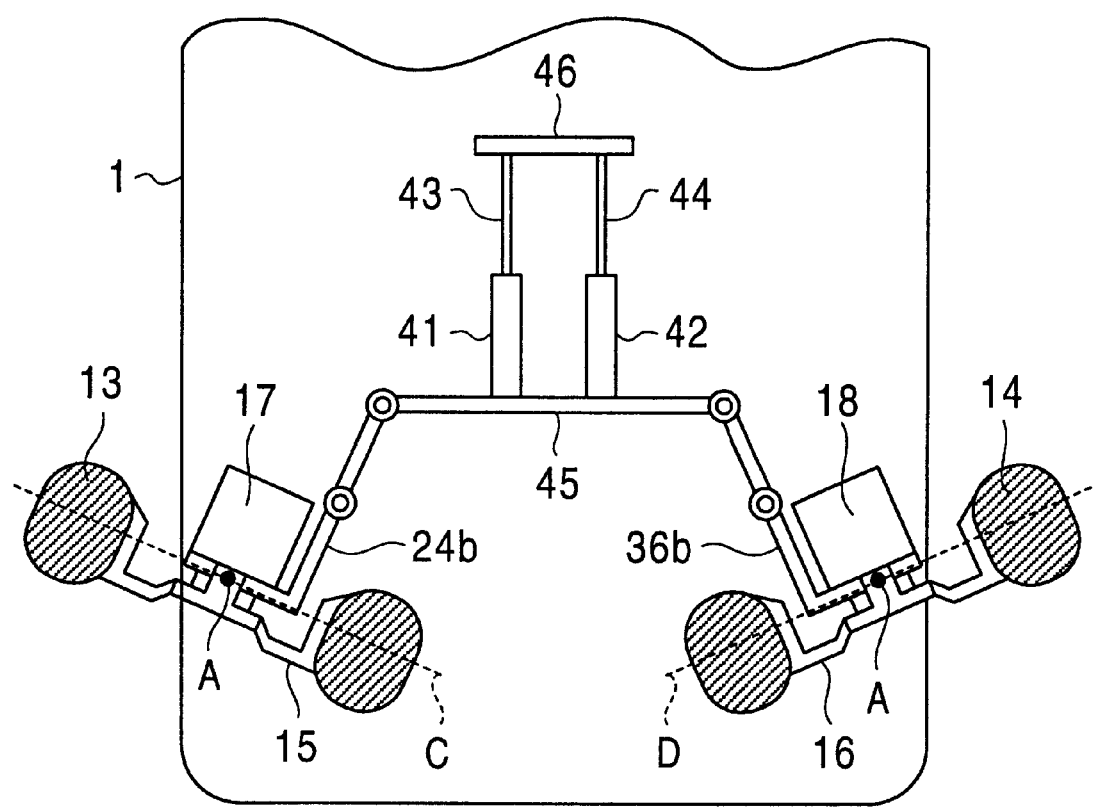
FIG. 8 is a diagram illustrating the state of rear wheels in a turn mode.

After executing step S5, the rear wheel steering angle controller 60 determines whether or not the turn position signal has been generated (step S6). As the rim 45 moves to a position close to the hydraulic cylinders 41, 42, the rim sensor 62 generates the turn position signal. When the turn position signal is generated, the left and right rear wheels 15, 16 are generally brought into internally inclined attitude as illustrated in FIG. 8. In the illustrated state, the left and right rear wheels 15, 16 are defined at predetermined angular positions along tangential directions of an arc passing the points indicated by reference letters A in FIG. 1, with the center of the arc (indicated by reference letter B in FIG. 1) being located in a central portion of the rotating axle of the front wheels 4, 5. Broken lines C, D in FIG. 8 indicate the tangential positions. The point indicated by reference letter A is at the position of the screw 30a of the trailing arm 30 on the left side of the vehicle, which is the point at which the knuckle 24 intersects the shaft 17a of the motor 17. Likewise, on the right side of the vehicle, the point indicated by reference letter A is at the position at which the knuckle 36 intersects the shaft of the motor 18.

As the turn position signal is generated, the rear wheel steering angle controller 60 stops driving the motor 53 to stop the operation of the hydraulic pump 52 (step S7), and generates a rear wheel steering completion signal to the turn controller 70 (step S8). Also, the rear wheel steering angle controller 60 drives the lamp 49 to blink, has the buzzer 50 generate continuous sound (step S9), and set a rear wheel steering flag F equal to "1" (step S10). The rear wheel steering flag F is initially set to "0."

Upon determining at step S1 that the mode switch 61 is OFF, the rear wheel steering angle controller 60 determines whether or not the rear wheel steering flag F is "1" (step S11). If the rear wheel steering flag F is equal to "0," the operation of this routine is terminated. On the other hand, if the rear wheel steering flag F is equal to "1," this means that the mode switch 61 has been turned OFF to recover the original straight traveling steering angle for the left and right rear wheels 15, 16, which have been controlled to be in the internally inclined attitude to have a steering angle suitable for turning, so that the rear wheel steering angle controller 60 generates a turn stop instruction signal to the turn controller 70 (step S12), drives the motor 53 to operate the hydraulic pump 52 (step S13), and stops driving the solenoid 54a of the electromagnetic valve 54 in the excited state (step S14). In addition, the rear wheel steering angle controller 60 drives the lamp 49 to blink, and has the buzzer 50 generate intermittent sound (step S15). The execution of steps S13 and S14 causes the hydraulic pump 52 to discharge oil within the oil tank 51, and the internal paths of the electromagnetic valve 54 to be switched, so that the discharged oil is supplied to the oil chambers 41a, 42a of the respective hydraulic cylinders 41, 42 through the electromagnetic valve 54. On the other hand, the oil chambers 41b, 42b of the hydraulic cylinders 41, 42 communicate with the oil tank 51 through the electromagnetic valve 54 to return the oil within the oil chambers 41b, 42b to the oil tank 51 through the electromagnetic valve 54. Thus, the discharged oil from the oil tank 51 by the hydraulic pump 52 is supplied to the oil chambers 41a, 42a, thereby acting to increase the volumes of the oil chambers 41a, 42a to press the pistons 47, 48 toward the oil chambers 41b, 42b. The movements of the pistons 47, 48 toward the oil chambers 41b, 42b causes associated movements of the rods 43, 44 and the rims 45, 46 to the rear of the vehicle.

As the rim 45 moves toward the rear of the vehicle, the left and right knuckle arms 24b, 36b are pressed to the rear of the vehicle through the left and right connecting arms 32, 40, respectively, thus causing pivotal movements of the left and right rear wheels 15, 16 concerning the supporting shafts of the knuckles 24, 36 such that the wheels 15, 16 are oriented in the straight traveling direction of the vehicle. More specifically, the movement of the rim 45 causes pivotal movements of the rear tires 13, 14, the motors 17, 18, the knuckles 24, 36, and portions coupled to the rotating shafts 17a, 18a of the motors 17, 18 as well as the rear wheels 15, 16.

During the pivotal movements of the left and right rear wheels 15, 16, the lamp 49 is driven to blink, while the buzzer 50 generates intermittent alarming sound.

After executing step S15, the rear wheel steering angle controller 60 determines whether or not the straight traveling position signal has been generated (step S16). As the rim 46 moves to a position close to the hydraulic cylinders 41, 42, the rim sensor 63 generates the straight traveling position signal. When the straight traveling position signal is generated, the left and right rear wheels 15, 16 are generally returned to the original straight traveling attitude as illustrated in FIG. 1.

As the straight traveling position signal is generated, the rear wheel steering angle controller 60 stops driving the hydraulic pump 52 (step S17), stops driving the lamp 49 and the buzzer 50 (step S18), and sets the rear wheel steering flag F equal to "0" (step S19).

Figure 9:
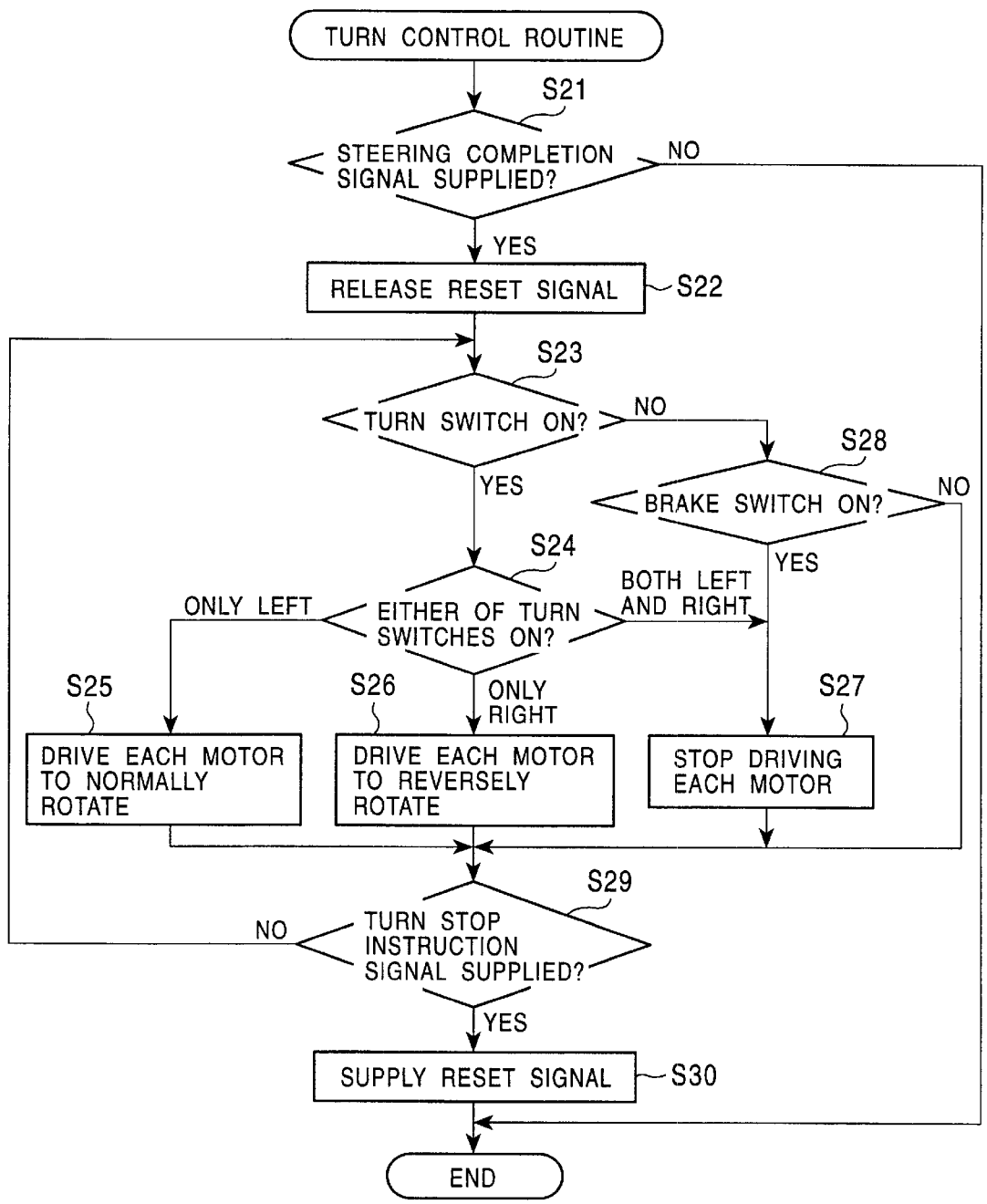
FIG. 9 is a flow chart illustrating a turn control routine.

Next, in the turn control routine as illustrated in FIG. 9, the turn controller 70 determines whether or not the rear wheel steering completion signal has been generated (step S21). As the rear wheel steering angle controller 60 has generated the steering completion signal at the aforementioned step S8, the steering completion signal is supplied to the turn controller 70.

Upon receipt of the steering completion signal, the turn controller 70 releases the reset signal (step S22). Since the motors 17, 18 are normally supplied with the reset signal from the turn controller 70 and therefore disabled to rotate, the reset signal supplied to the motors 17, 18 is stopped to bring the same into a motor operation waiting state.

After executing the step S22, the turn controller 70 determines whether or not the turn switches are ON (step S23). When at least one of the left and right turn switches 74, 75 is ON, the turn controller 70 determines which of the turn switches 74, 75 is ON (step S24). The turn controller 70 drives the motors 17, 18 to normally rotate when the left turn switch 74 alone is ON (step S25); drives the motors 17, 18 to reversely rotate when the right turn switch 75 alone is ON (step 26); and stops driving the motors 17, 18 when both the left and right turn switches 74, 75 are ON (step S27). When both the left and right turn switches 74, 75 are OFF, the turn controller 70 determines whether or not the brake switch 76 is ON (step S28). When the brake switch 76 is ON, the turn control routine proceeds to step S27 where the turn controller 70 stops driving the motors 17, 18.

When the operations at steps S23 to S28 indicate that the left turn switch 74 is manipulated to turn ON, the turn controller 70 supplies the motors 17, 18 with a normal/reverse rotation signal for specifying normal rotation, causing the motors 17, 18 to normally rotate in response to the normal/reverse rotation signal to drive the rear wheels 15, 16 to rotate, resulting in the vehicle turning counter clockwise. On the other hand, when the right turn switch 75 is manipulated to turn ON, the turn controller 70 supplies the motors 17, 18 with a normal/reverse rotation signal for specifying reverse rotation, causing the motors 17, 18 to reversely rotate in response to the normal/reverse rotation signal to drive the rear wheels 15, 16 to rotate, resulting in the vehicle turning clockwise. The center on which the vehicle is turned is positioned at the center of the rotating axle of the front wheels 4, 5, as mentioned above (indicated by reference letter B in FIG. 1). As the brake switch 76 is manipulated to turn ON, the turn controller 70 supplies the motors 17, 18 with a brake signal, to brake the rotation of the motors 17, 18 to stop. Likewise, when the left turn switch 74 and the right turn switch 75 are both manipulated to turn ON, the motors 17, 18 are supplied with the brake signal, and therefore brought into a braked state.

Upon driving the motors 17, 18 to normally or reversely rotate, as described above, the turn controller 70 supplies a motor main signal to the relay unit 71. In the relay unit 71, the relay coil 81 is excited in response to the motor main signal to turn the relay switch 83 ON. The relay switch 83 thus turned ON lets a current flow from the positive terminal of the battery 86, through the fuse 85, the relay switch 83 and the motors 17, 18, into the negative terminal of the battery 86. In this way, the motors 17, 18 are applied with an output voltage of the battery 86 to produce normal rotation or reverse rotation thereof.

After executing step S26, S27 or S28, the turn controller 70 determines whether or not the turn stop instruction signal has been supplied thereto (step S29). As the mode switch 61 is manipulated to turn OFF to cause the rear wheel steering angle controller 60 to generate the turn stop instruction signal at the aforementioned step S12, the turn stop instruction signal is supplied to the turn controller 70. If no turn stop instruction signal is supplied, the turn controller 70 returns to step S23 to repeat the foregoing operations. On the other hand, the turn stop instruction signal, if supplied, terminates the turning operation of the vehicle, so that the turn controller 70 supplies the reset signal to the motors 17, 18 (step S30), followed by the termination of this routine. The reset signal supplied to the motors 17, 18 results in locking the motors 17, 18 which are thus set into a rotation disabled state.

For making a turn, the driver first manipulates the transmission into the P position to allow the turn mode, and subsequently manipulates the mode switch 61 to turn ON. As a result, the vehicle is set into the turn mode, causing the left and right rear wheels 15, 16 so far oriented in the vehicle straight traveling direction to start pivotal movements concerning their respective vertical axes. During the pivotal movements, the lamp 49 blinks, and the buzzer 50 generates intermittent alarming sound. When the left and right rear wheels 15, 16 are brought into the internally inclined attitude as previously illustrated in FIG. 8, the lamp 49 is continuously lit, and the buzzer 50 generates continuous alarming sound. The driver recognizes through the lit lamp 49 or the continuous alarming sound of the buzzer 50 that a turning operation is enabled.

Then, as the driver manipulates the left turn switch 74 to turn ON, the motors 17, 18 are normally rotated to cause normal rotations of the rear wheels 15, 16, resulting in turning the vehicle clockwise. On the other hand, as the driver manipulates the right turn switch 75 to turn ON, the motors 17, 18 are reversely rotated to cause reverse rotations of the wheels 15, 16, resulting in turning the vehicle clockwise. For stopping the turning operation, the driver manipulates the brake switch 76 or both the left and right turn switches 74, 75 to turn ON. In this way, the motors 17, 18 are braked to stop the rotations of the motors 17, 18, i.e., the rotations of the rear wheels 15, 16.

After the driver has made a desired turn, the driver manipulates the mode switch 61 to turn OFF. The mode switch 61, when turned OFF, causes the lamp 49 to blink, and the buzzer 50 to generate intermittent alarming sound. Then, the left and right rear wheels 15, 16 now in the internally inclined attitude start pivotal movements concerning the respective vertical axes so as to orient in the vehicle straight traveling direction. As the left and right rear wheels are returned to the original vehicle straight traveling direction, the lamp 49 stops blinking, and the buzzer 50 stops generating the intermittent alarming sound. The driver recognizes through the unlit lamp 49 or the stopped intermittent alarming sound from the buzzer 50 that the turn mode has been terminated to set the vehicle again into the normal mode. In the foregoing embodiment, the feature for engaging the knuckle 24 with the trailing arm 30 constitutes a rotation supporting means which supports one of the left and right wheels rotatable concerning an axis perpendicular to the ground, while the feature composed of the hydraulic cylinders 41, 42, the rods 43, 44, the rims 45, 46, and the connecting arms 32, 40 constitutes a rotating position fixing means. Also, the motors 17, 18 correspond to a turn driving means for applying a rotating torque to one of the left and right wheels to turn the vehicle.

Since the foregoing embodiment has been described for a vehicle equipped with an automatic transmission, step S2 determines whether or not the shift position of the transmission lies in the P position. For a vehicle equipped with a manual transmission, step S2 may determine whether or not the shift position lies in a neutral position.

Figure 10:
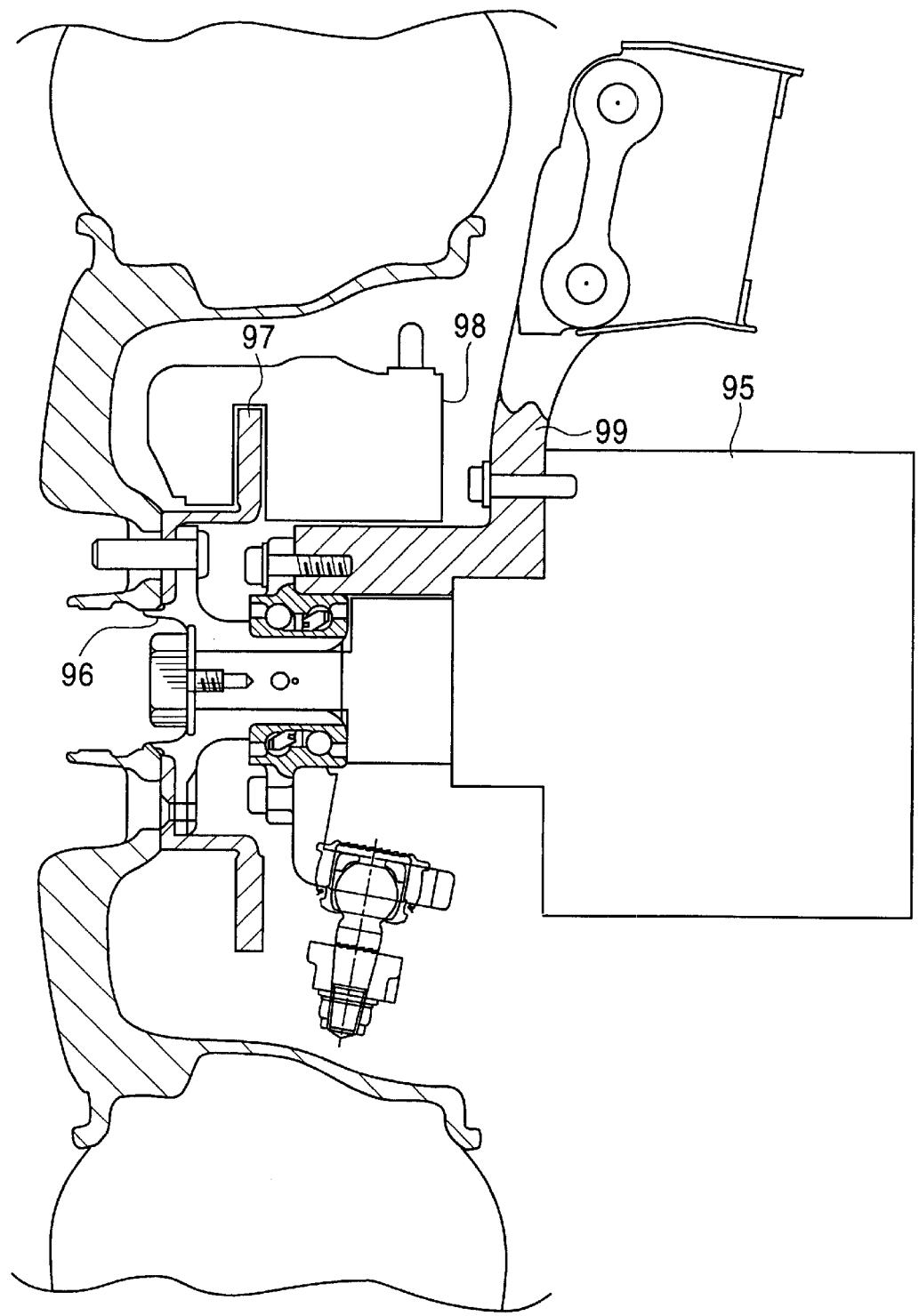
FIG. 10 is a cross-sectional view specifically illustrating a feature associated with the rear wheel, including a brake mechanism.

Also, in the foregoing embodiment, the motors 17, 18 are braked in response to a manipulation on the brake switch 76 to stop the pivotal movements of the rear wheels. Alternatively, a brake pedal may be stepped on to apply a braking force to the pivotal movements of the rear wheels to stop the same. In the latter case, as illustrated in FIG. 10, a disk brake 97 is fixed to a hub 96 coupled to a motor 95, a brake caliper 98 is fixed to a knuckle 99, and the disk brake 97 is brought into contact with the brake caliper 98 in response to the stepped-on brake pedal to generate a braking force.

Further, since the foregoing embodiment has been described for a front wheel drive vehicle, the rear wheels are pivoted into the internally inclined attitude in the turn mode. For a rear wheel drive vehicle, on the other hand, front wheels should be pivoted into a similar internally inclined attitude. In the latter case, the front wheels are fixed at predetermined angular positions along tangential directions of an arc having the center located in a central portion of the rotating axle between the rear wheels.

Also, while in the foregoing embodiment, each of the rear wheels is provided with the separate motor 17 or 18, the motors may be formed in the respective rear wheels.

Further, in the foregoing embodiment, the left and right wheels are simultaneously pushed by way of a pair of cylinders. Alternatively, the left and right wheels may be individually driven, or may be applied with a driving force in a lateral direction of the vehicle. For example, the left and right knuckle arms 24b, 36b may be directly pushed without intervention of the rim 45 and the arms 32, 40, respectively. Further alternatively, the driving force may be applied in a variety of ways such as by use of a differential rack.

As described above, according to the four-wheel vehicle of the foregoing embodiment, one of front and rear pairs of left and right wheels, to which a running torque by a driving source is not transmitted, are arranged for rotation concerning their respective axes perpendicular to the ground, and the one pair of left and right wheels are fixed during a vehicle turning operation at angular positions along tangential directions of an arc passing axes of the one pair of the left and right wheels perpendicular to the ground and having the center near the center point of the rotating axle of the other pair of left and right wheels, so that it is possible to provide a relatively simple and small turning mechanism. Also, because the radius of the arc passing the axes of the one pair of left and right wheels perpendicular to the ground and having the center near the center point of the rotating axle of the other pair of left and right wheels is the turning radius when the vehicle is turned, the turning radius is extremely small. Thus, the four-wheel vehicle according to the foregoing embodiment, because of its ability of making a small and sharp turn, facilitates the driving which involves a turning operation of the vehicle such as column parking, entry into a garage, U-turn, and so on.

Figure 11:
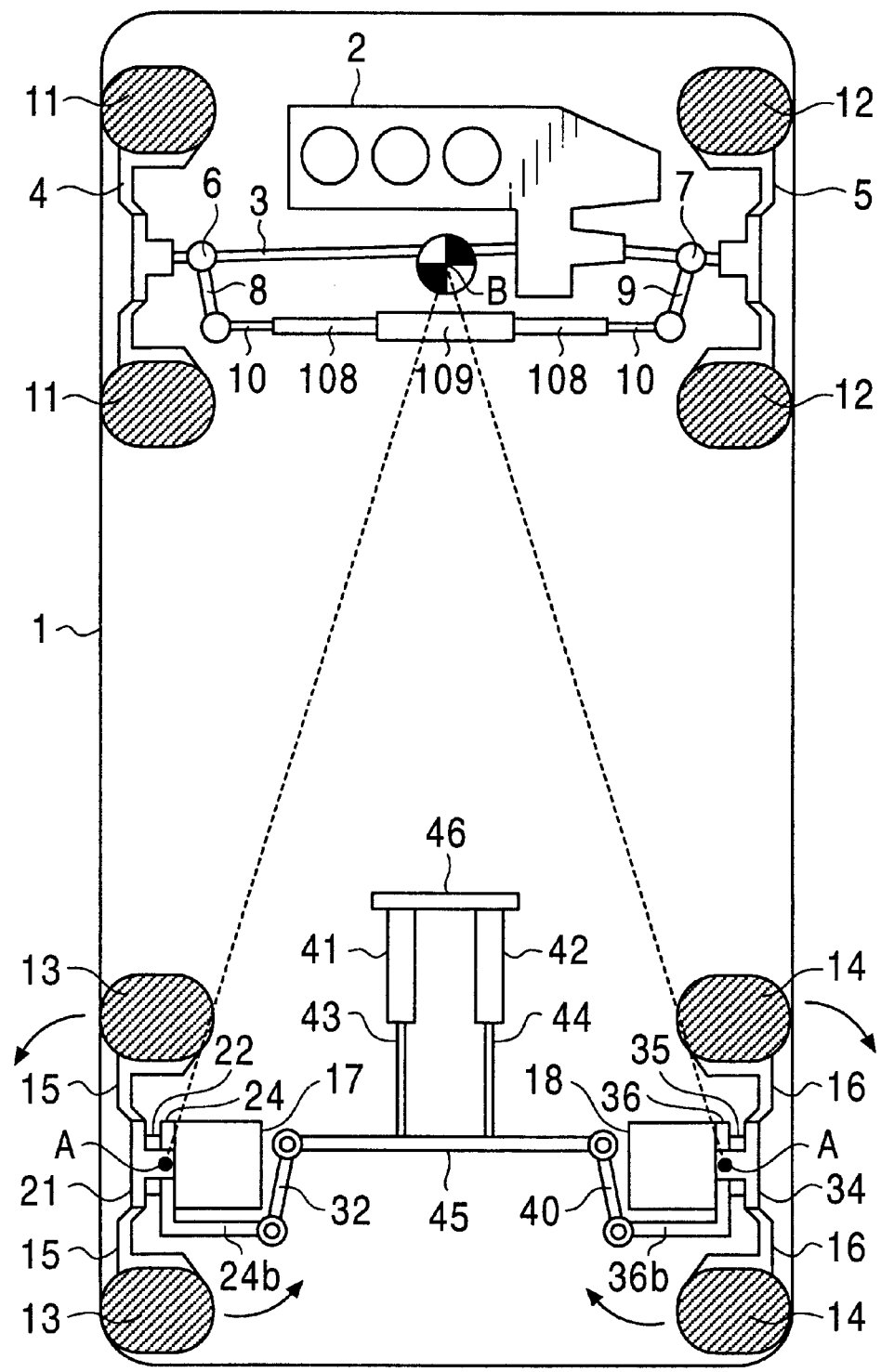
FIG. 11 is a diagram generally illustrating the structure of a four-wheel vehicle as an embodiment of the present invention.

FIG. 11 generally illustrates the structure of a four-wheel vehicle equipped with a turning mechanism according to another embodiment of the present invention. In FIG. 11, parts identical to those in the vehicle illustrated in FIG. 1 are designated the same reference numerals.

FIG. 11 illustrates the vehicle viewed from a horizontal plane including the cross-sections of four front and rear tires 11–14 of the vehicle. The illustrated vehicle 1 is a front wheel driven (FF) vehicle which has an engine body 2 positioned in a front portion of the vehicle 1 to drive the front wheels 4, 5 on the left and right sides to rotate through a driving axle 3. Front wheels 4, 5 inside the left and right front tires 11, 12 are coupled to a steering mechanism composed of knuckles 6, 7, knuckle arms 8, 9, a tie rod 10, a cylinder 108, and a steering gear 109. The cylinder 108 is fixed to the vehicle body 1.

Left and right rear wheels 15, 16 inside left and right rear tires 13, 14 in turn are rotatably arranged. Each of the rear wheels 15, 16 is coupled to a motor 17 or 18, such that the rear wheels 15, 16 are driven by the respective motors 17, 18 for rotation. The motors 17, 18, which function as driving sources for turning the vehicle body 1, are forwardly rotated when the vehicle body 1 is turned to the left, and are reversely rotated when the vehicle body 1 is turned to the right.

Figure 12:
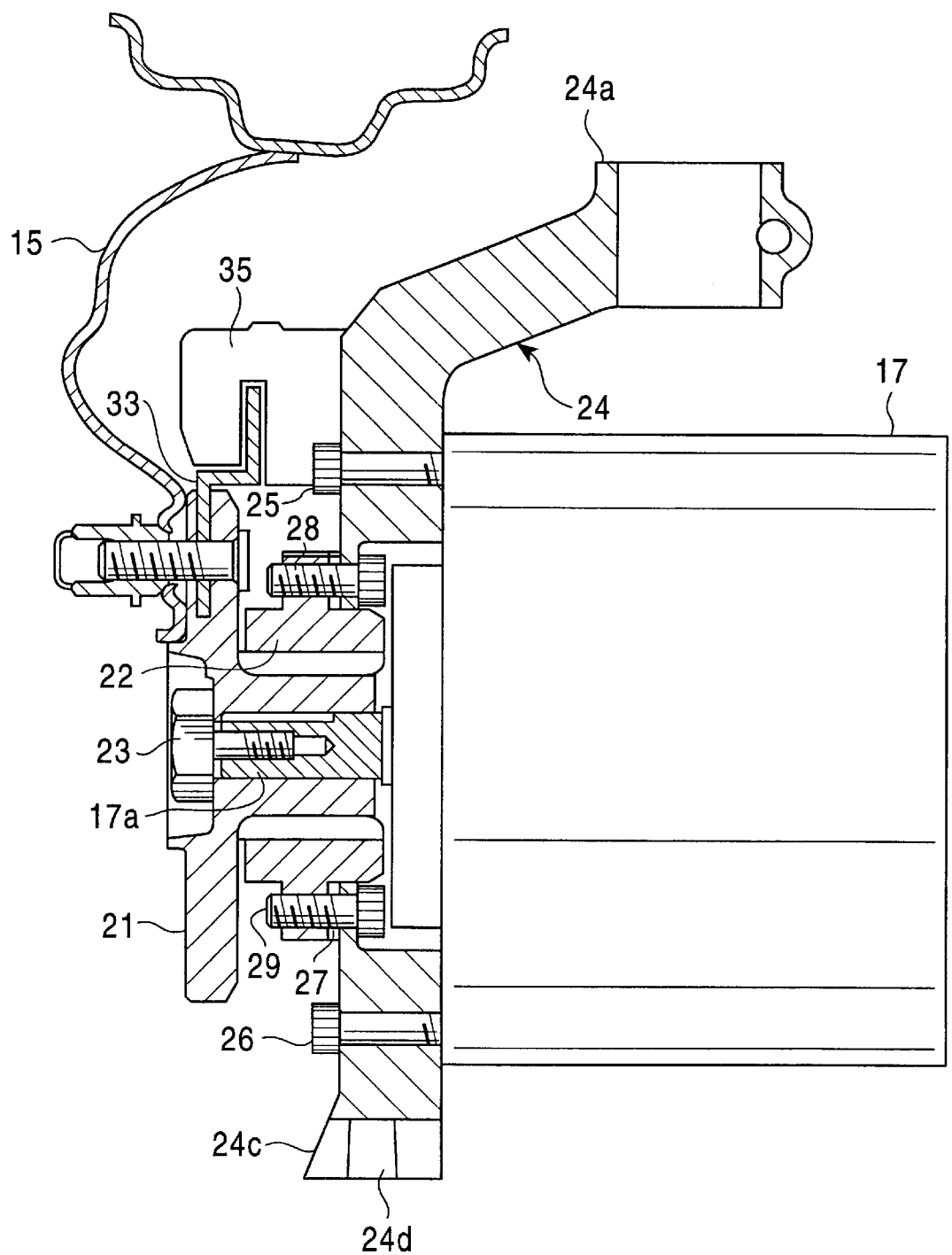
FIG. 12 is a cross-sectional view illustrating specifically a feature associated with a rear wheel.

A flange-shaped hub 21 is arranged at the center of the rear wheel 15, and the hub 21 is rotatably supported by a bearing 22, as specifically illustrated in FIG. 12 and the aforementioned FIG. 3. A rotating shaft 17a of the motor 17 is inserted into a central axial hole of the hub 21 from the inside, and a bolt 23 is screwed into the rotating shaft 17a from the outside of the hub 21 to couple the hub 21 and the rotating shaft 17a of the motor 17. The motor 17 is secured to a ring-shaped knuckle 24 on a protruding surface of the rotating shaft 17a with bolts 25, 26. As can be seen in FIG. 12, the knuckle 24 has a lower portion cut away from the ring shape thereof, which serves as a support 24c pivotally coupled to a screw 30a of a trailing arm 30. More specifically, the screw 30a of the trailing arm 30 is inserted into a throughhole 24d of the support 24c from below, and the screw 30a is screwed into a nut 30b. This pivotal coupling of the trailing arm 30 to the knuckle 24 enables the rear wheel 15 to pivotally move on an axis perpendicular to the ground.

Also, a bearing 22 is secured to the knuckle 24 through a washer 27 with bolts 28, 29. The knuckle 24 has two knuckle arms 24a, 24b extending from the outer periphery thereof, with a shock absorber 31 coupled to the leading end of the knuckle arm 24a. The knuckle arm 24b, which is formed in L-shape, is coupled to ne end of a connecting arm 32 which forms part of a turning mechanism. The connecting arm 32 is arranged for two-dimensional pivotal movements on the coupling point.

A brake disk 33 is also fixed to the hub 21, and a brake caliper 35 is fixed to the knuckle 24, such that the brake disk 33 comes in contact with the brake caliper 35 to generate a braking force in response to the driver stepping on a brake pedal, not shown.

It will be understood that while FIGS. 12 and 3 illustrate only the feature associated with the coupling of the left rear wheel 15 and the motor 17, a feature associated with the coupling of the right rear wheel 16 and the motor 18 is formed symmetric to the feature associated with the coupling of the left rear wheel 15 and the motor 17.

Figure 13:
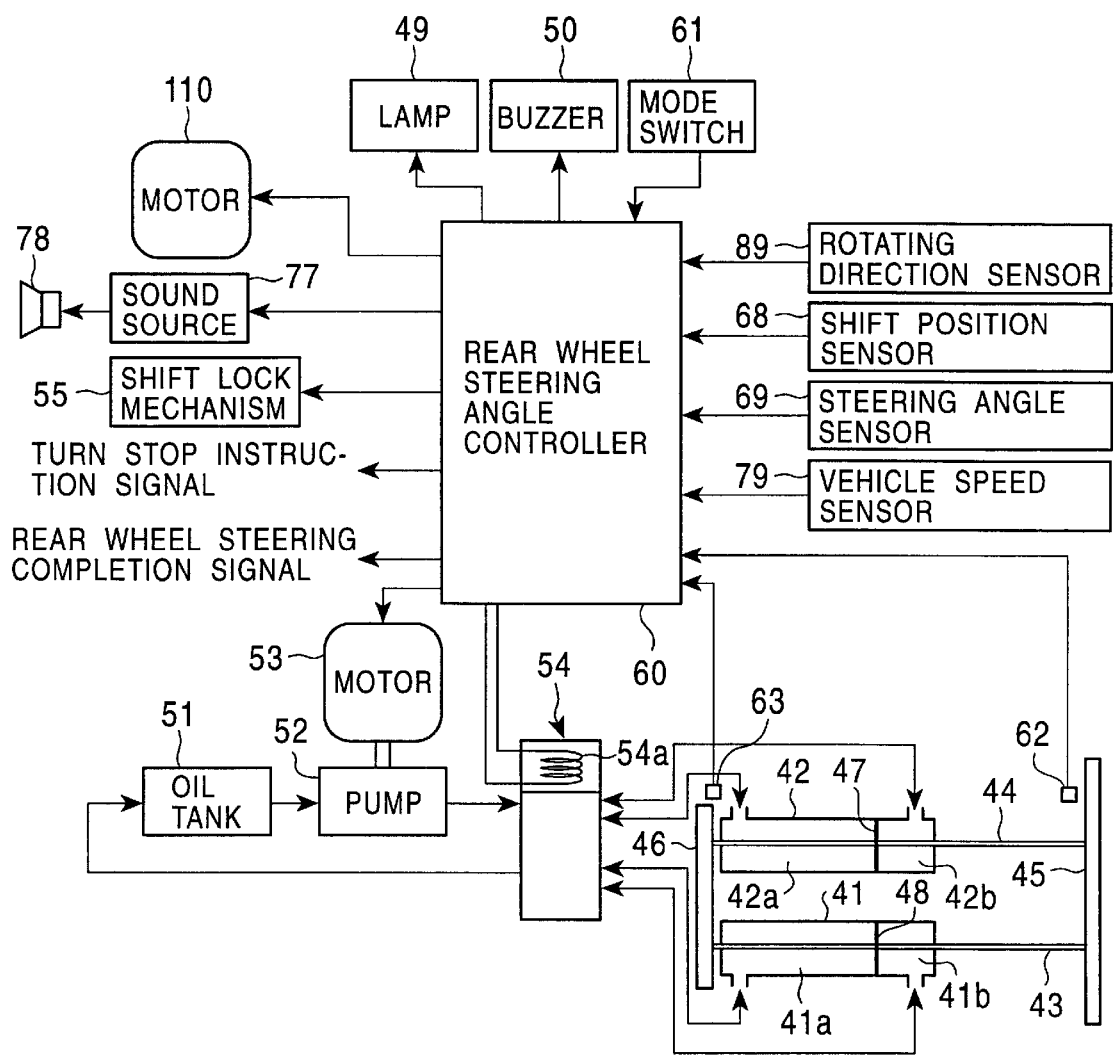
FIG. 13 is a block diagram illustrating a rear wheel steering system including a hydraulic circuit and an electrical circuit.

As illustrated in FIG. 11, the turning mechanism comprises a right connecting arm 40, two hydraulic cylinders 41, 42, two rods 43, 44, and two rims 45, 46 in addition to the above-mentioned left connecting arm 32. The hydraulic cylinders 41, 42 are fixed to the vehicle body 1 in parallel with each other such that pistons 47, 48 arranged therein are slidable in the longitudinal direction of the vehicle body 1, as illustrated in FIG. 13 later described. The rods 43, 44 extend through the corresponding hydraulic cylinders 41, 42. The rims 45, 46 are bar-shaped members which serve as stoppers. The rim 45 has one end coupled to the other end of the connecting arm 32 for two-dimensional pivotal movements and the other end coupled to the other end of the connecting arm 40 for two-dimensional pivotal movements. The rims 45, 46 are arranged in parallel with each other, with the rods 43, 44 interposed therebetween. Each of the rods 43, 44 has one end secured to the rim 45, and the other end secured to the rim 46. The rods 43, 44 are coupled to and extend through the pistons 47, 48 in the hydraulic cylinders 41, 42, respectively, so that the rods 43, 44 are associated with movements of the pistons 47, 48.

The hydraulic cylinders 41, 42 are formed with oil chambers 41a, 41b, 42a, 42b, respectively, on both sides thereof divided by the respective pistons 47, 48, and each of the oil chambers is formed with oil inlet and outlet.

In a normal mode, the pistons 47, 48 are positioned on the rear side of the vehicle within the hydraulic cylinders 41, 42 by a rear wheel steering system, later described, forcing the rear tires 13, 14 to be set in a straight traveling attitude in association with that positioning. In a turn mode, unlike the normal mode, the pistons 47, 48 are positioned on the front side of the vehicle within the hydraulic cylinders 41, 42 by the rear wheel steering system, forcing the rear tires 13, 14 to be set in an internally inclined attitude, as will be later described, in association with that positioning.

FIG. 13 illustrates the rear wheel steering system including a hydraulic circuit and an electrical circuit for the hydraulic cylinders 41, 42. The hydraulic circuit has an oil tank 51, a hydraulic pump 52, a motor 53, and an electromagnetic valve 54. The motor 53 is provided for driving the hydraulic pump 52. Oil within the oil tank 51 is discharged by the hydraulic pump 52 and supplied to the electromagnetic valve 54. The electromagnetic valve 54 has an oil inlet from the pump 52 and an oil outlet to the oil tank 51. The electromagnetic valve 54 also has four ports individually connected to the respective oil chambers 41a, 41b, 42a, 42b of the hydraulic cylinders 41, 42. The electromagnetic valve 54 is operated to switch the hydraulic circuit such that the oil inlet is internally in oil communication with two ports from the oil chambers 41a, 42a, while the oil outlet is in oil communication with two ports from the oil chambers 41b, 42b, when a solenoid 54a of the electromagnetic valve 54 is in a non-excited state, and the oil inlet is internally in oil communication with the two ports from the oil chambers 41b, 42b, while the oil outlet is in oil communication with the two ports from the oil chambers 41a, 42a, when the solenoid 54a of the electromagnetic valve 54 is in an excited state. It should be noted that pipe lines arranged between the oil tank 51, the hydraulic pump 52, the electromagnetic valve 54, and the hydraulic cylinders 41, 42 are simply indicated by solid lines and not designated by reference numerals in FIG. 13.

A rear wheel steering angle controller 60 controls the driving of the motor 53, and switches the solenoid 54a of the electromagnetic valve 54 between the excited and non-excited states. The rear wheel steering angle controller 60 comprises a microcomputer which operates in accordance with an associated program. The rear wheel steering angle controller 60 is connected to a mode switch 61 which is manipulated by the driver to instruct the turn mode, and rim sensors 62, 63 for detecting the positions of the rims 45, 46, respectively. The rim sensor 62 generates a turn position signal when the rim 45 is at a position close to the hydraulic cylinders 41, 42, while the rim sensor 63 generates a straight traveling position signal when the rim 46 is at a position close to the hydraulic cylinders 41, 42. In addition, the rear wheel steering angle controller 60 is connected to a lamp 49 and a buzzer 50, such that the lamp 49 blinks or lights in the turn mode, and the buzzer 50 generates intermittent or continuous alarming sound in the turn mode.

Further, the rear wheel steering angle controller 60 is connected to a shift position sensor 68 for detecting a shift position of a transmission (not shown) of the vehicle, a steering angle sensor 69 for detecting a steering angle from a reference angle of the front wheels 4, 5 based on a rotating angle of a steering wheel (indicated by reference numeral 92 in FIG. 15), and a rotating direction sensor 89 for detecting a rotating direction of the steering wheel 92. The shift position sensor 68 supplies the rear wheel steering angle controller 60 with a P position signal when the shift position of the transmission of the vehicle is in a P (parking) position.

The transmission is provided with a shift lock mechanism 55. The shift lock mechanism 55 disables the shift lever to be shifted from the P position to another position such as an R (reverse), N (Neutral), D (Drive), "2" (second gear), "1" (first gear), or the like. For example, the shift lever is electromagnetically locked so that such shifting is disabled.

The shift lock mechanism 55 is controlled by the rear wheel steering angle controller 60.

Each of the motors 17, 18 is applied with a supply voltage, a normal/reverse rotation signal indicative of a rotating direction, a speed signal for specifying a rotational speed, a brake signal for instructing a braking operation, and a reset signal for prohibiting a turn. The supply voltage and respective signals are controlled individually by a turn controller 70.

Figure 14:
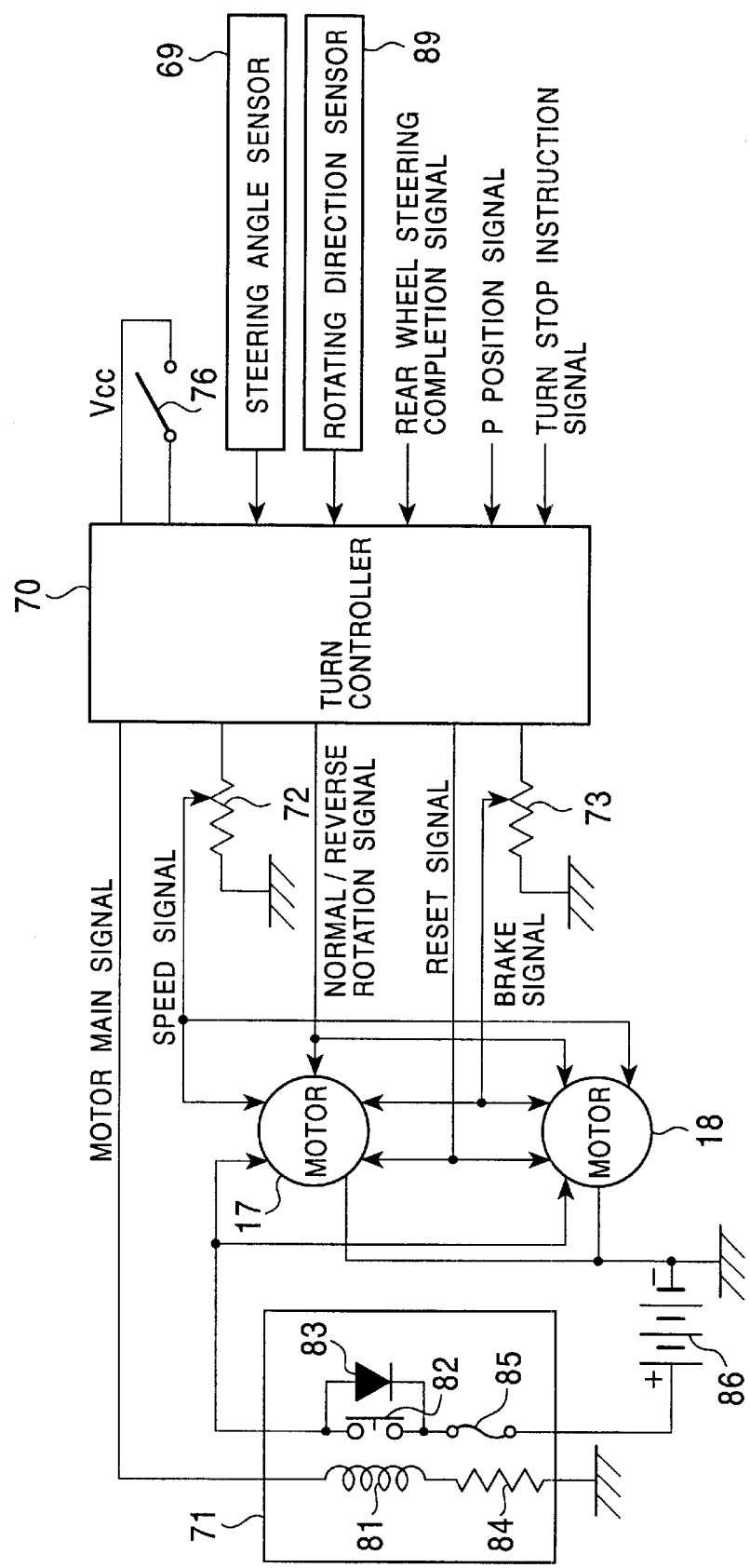
FIG. 14 is a circuit diagram illustrating a driving control system.

FIG. 14 illustrates a driving control system for the motors 17, 18. The driving control system comprises, in addition to the turn controller 70, a relay unit 71, a speed adjusting volume 72, a brake adjusting volume 73, and a brake switch 76. The turn controller 70 is based on a microcomputer. The brake switch 76 is a switch which turns ON only when it is manipulated.

The relay unit 71 comprises a relay coil 81, a relay switch 82, a diode 83, a resistor 84, and a fuse 85. The relay coil 81 and the resistor 84 are connected in series, and arranged such that the relay coil 81 is excited as the relay coil 81 and the resistor 84 are supplied with a motor main signal output from the turn controller 70. The relay switch 82 and the diode 83 are connected in parallel to form a parallel circuit which has one end connected to a positive terminal of a buttery 86, which serves as a power supply, through the fuse 85, and the other end connected to a positive input terminal of a voltage source for the motors 17, 18. The voltage source for the motors 17, 18 has its negative input terminal connected to a negative terminal of the battery 86 for grounding.

The normal/reverse rotation signal, the speed signal, the brake signal and the reset signal are generated from the turn controller 70. The normal/reverse rotation signal and the reset signal are supplied as they are to the motors 17, 18. The speed signal is supplied to the motors 17, 18 through a speed adjusting volume 72, while the brake signal is supplied to the motors 17, 18 through the brake adjusting volume 73. The speed adjusting volume 72 and the brake adjusting volume 73 adjust the level of the speed signal and the level of the brake signal in response to manipulations made thereon, respectively.

The brake switch 76 is applied at one end thereof with a voltage Vcc corresponding to a high level, and the brake switch 76 has the other end connected to the turn controller 70. The turn controller 70 is supplied with a steering completion signal indicative of the completion of turn steering angle control from the rear wheel steering angle controller 60 in addition to the P position signal supplied thereto. The turn controller 70 is also connected to a steering angle sensor 69 and a rotating direction sensor 89 as well as to a speaker 78 through a sound source 77, not shown in FIG. 14.

Figure 15:
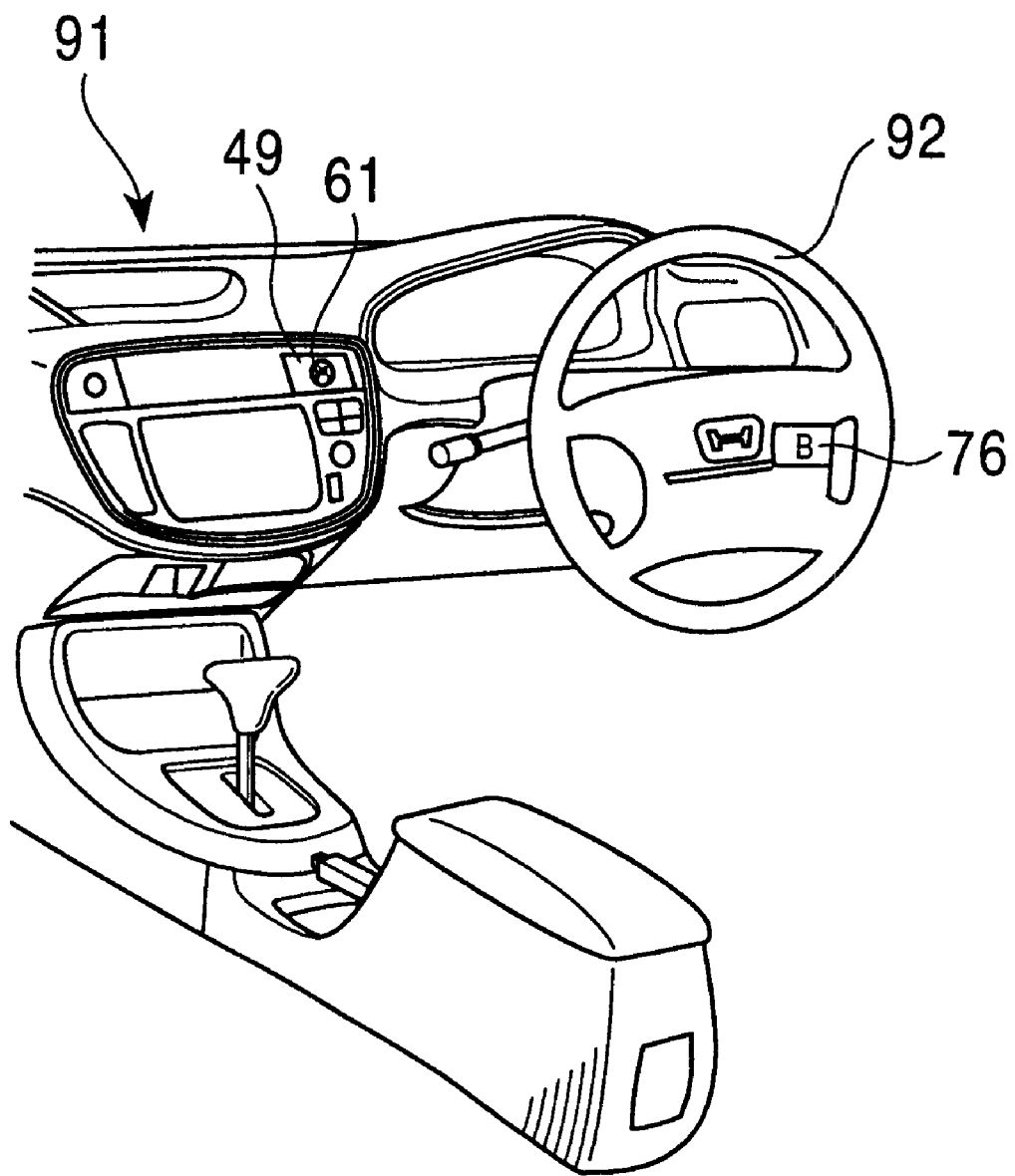
FIG. 15 is a diagram illustrating where switches and lamps shown in FIGS. 13 and 14 are disposed within the vehicle.

FIG. 15 illustrates positions at which the mode switch 61 and the brake switch 76 are disposed within the vehicle. The mode switch 61 is located in a central portion of a front panel 91, while the brake switch 76 is arranged integral with a steering wheel 92. Also, around the mode switch 61, a lighting or blinking display is provided by the lamp 49.

In the vehicle, the steering wheel 92 is not mechanically connected to a steering gear 109 of the aforementioned steering mechanism, and instead, the vehicle is provided with a steering mechanism of a steer-by-wire type for detecting a manipulation of rotating the steering wheel 92 to drive the steering gear 109 by a front wheel steering motor (indicated by reference numeral 110 in FIG. 13) in response to the detection result. The steering wheel 92 contains a torque sensor (not shown) for detecting a rotating torque of the steering wheel 92 in addition to the steering angle sensor 69 and the rotating direction sensor 89 mentioned above. The rotation of the motor 110 is controlled by the rear wheel steering angle controller 60.

Next, the operation of the foregoing turning mechanism will be described in accordance with associated programs processed by the rear wheel steering controller 60 and the turn controller 70. The rear wheel steering angle controller 60 executes a rear wheel steering routine, while the turn controller 70 executes a turn control routine.

Figure 16:
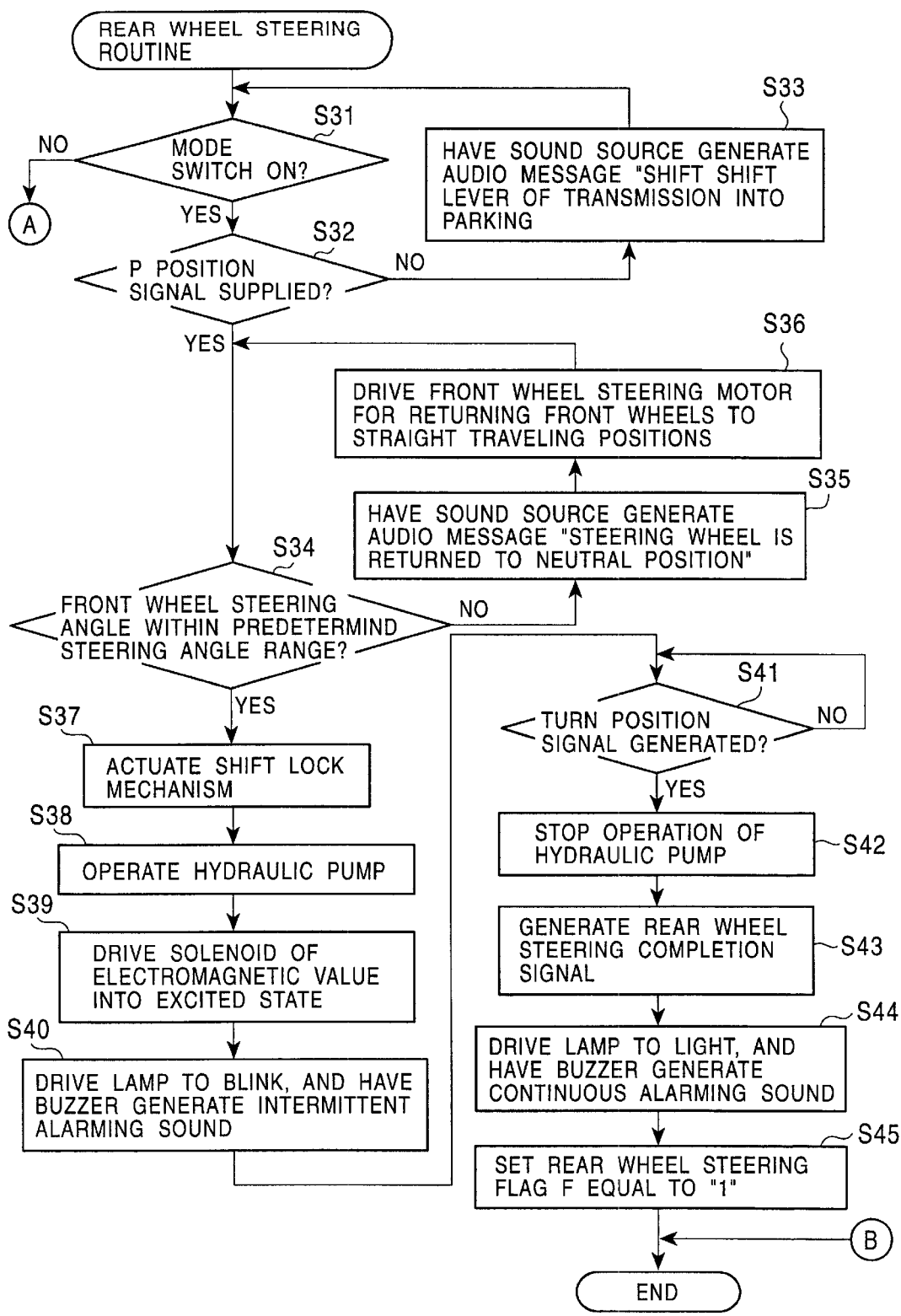
FIG. 16 is a flow chart illustrating a rear wheel steering routine.
Figure 17:
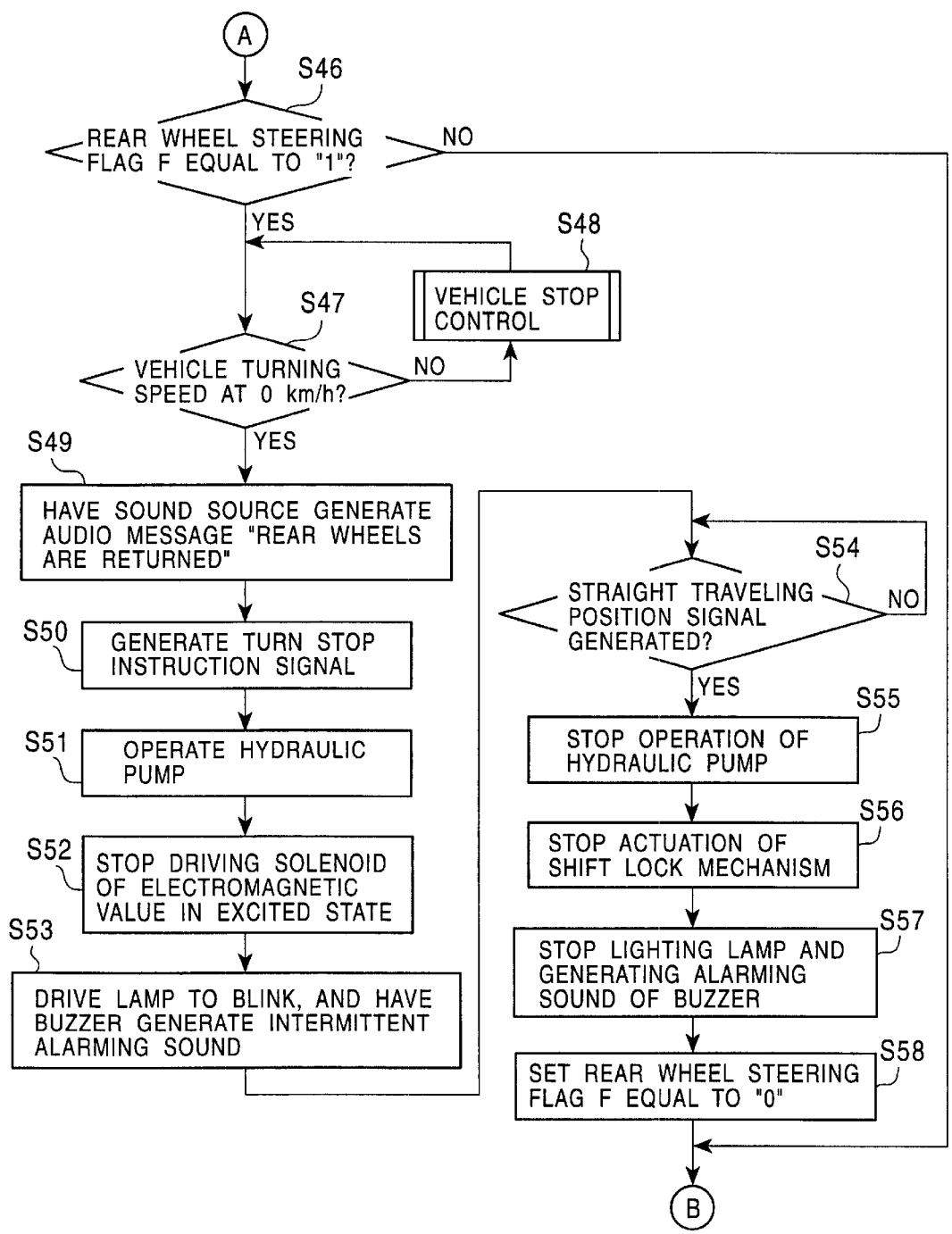
FIG. 17 is a flow chart illustrating steps continued from the rear wheel steering routine of FIG. 16.

In the rear wheel steering routine illustrated in FIGS. 16 and 17, the rear wheel steering angle controller 60 first determines whether or not the mode switch 61 is ON (step S31). As the mode switch 61 is turned ON, the rear wheel steering angle controller 60 determines whether or not the P position signal has been supplied thereto from the shift position sensor 68 (step S32). The step S32 is provided for determining whether or not the vehicle is stopped. When no P position signal is supplied from the sift position sensor 68, the rear wheel steering angle controller 60 has the sound source 77 generate a voice message (step S33). This voice message may be a message for drawing attention of the driver such as "Shift the shift lever of the transmission into parking," which is generated in the sound source 77 as an audio signal and output through the speaker 78. After step S33, the rear wheel steering routine proceeds again to step S31.

When the P position signal has been supplied, the rear wheel steering angle controller 60 determines whether or not a front wheel steering angle provided from the steering angle sensor 69 is within a predetermined steering angle range in which the vehicle can travel straight (step S34). The step S34 is provided for determining that the front wheels 4, 5 are in a straight traveling attitude for letting the vehicle travel straight.

When positive answers are returned to the respective determinations at steps S32, S34, this means that the vehicle stops running with the front wheels 4, 5 placed in the straight traveling attitude, in which case the turn steering angle control can be initiated.

When determining at step S34 that the front wheel steering angle is not within the predetermined steering angle range, the rear wheel steering angle controller 60 has the sound source 77 generate a voice message (step S35), and drives the front wheel steering motor 110 for returning the front wheels 4, 5 to the straight traveling attitude (step S36). The voice message generated at step S35 may be a message for drawing attention of the driver such as "The steering wheel is returned to the neutral position," which is generated in the sound source 77 as an audio signal and output through the speaker 78. At step S36, the motor 110 is driven to rotate, thereby causing pivotal movements of the front wheels 4, 5, which have been steered to the left or to the right, toward the straight traveling attitude. As a result, when the front wheels 4, 5 return to the straight traveling attitude, the front wheel steering angle is determined to be within the predetermined steering angle at step S34, followed by the rear wheel steering routine proceeding to the next step S37.

When determining that the front wheel steering angle is within the predetermined steering angle range as described above, the rear wheel steering angle controller 60 actuates the shift lock mechanism 55 (step S37). The actuated shift lock mechanism 55 results in locking the shift lever of the transmission during a turning operation of the vehicle body 1. Since the locked shift lever is prevented from being shifted to another position such as R, N, D, "2," "1" or the like, the turning operation of the vehicle body 1 will not be interrupted due to an erroneous manipulation.

After executing step S37, the rear wheel steering angle controller 60 drives the motor 53 to operate the hydraulic pump 52 in order to start the turn steering angle control (step S38), and drives the solenoid 54a of the electromagnetic valve 54 into an excited state (step S39). In addition, the rear wheel steering angle controller 60 drives the lamp 49 to blink, and has the buzzer 50 generate intermittent alarming sound (step S40). The execution of steps S38 and S39 causes the hydraulic pump 52 to discharge oil within the oil tank 51, which is supplied to the oil chambers 41b, 42b in the respective hydraulic cylinders 41, 42 through the electromagnetic valve 54. On the other hand, the oil chambers 41a, 42a in the respective oil cylinders 41, 42 communicate with the oil tank 51 through the electromagnetic valve 54, so that the oil within the oil chambers 41a, 42a return to the oil tank 51 through the electromagnetic valve 54. Thus, the oil discharged from the oil tank 51 by the hydraulic pump 52 is supplied to the oil chambers 41b, 42b and acts to increase the volumes of the oil chambers 41b, 42b and therefore presses the pistons 47, 48 toward the oil chambers 41a, 42a. As the pistons 47, 48 are moved toward the oil chambers 41a, 42a, the rods 43, 44 and the rims 45, 46 are moved toward the front of the vehicle, associated with the movements of the pistons 47, 48.

As the rim 45 is moved toward the front of the vehicle, the left and right knuckle arms 24b, 36b are pulled toward the front of the vehicle through the left and right connecting arms 32, 40, causing pivotal movements of the left and right rear wheels 15, 16 concerning supporting shafts (indicated by reference letters A in FIG. 11) of the knuckles 24, 36 in a direction indicated by arrows shown in FIG. 11. More specifically, the movement of the rim 45 causes pivotal movements of the rear tires 13, 14, the motors 17, 18, the knuckles 24, 36, and portions coupled to the rotating shafts 17a, 18a of the motors 17, 18 as well as the rear wheels 15, 16.

During the pivotal movements of the left and right wheels 15, 16, the lamp 49 is driven to blink, while the buzzer 50 generates intermittent alarming sound.

After executing step S40, the rear wheel steering angle controller 60 determines whether or not the turn position signal has been generated (step S41). As the rim 45 moves to a position close to the hydraulic cylinders 41, 42, the rim sensor 62 generates the turn position signal. When the turn position signal is generated, the left and right rear wheels 15, 16 are generally in internally inclined attitude as illustrated in FIG. 8. In the illustrated state, the left and right rear wheels 15, 16 are defined at predetermined angular positions along tangential directions of an arc passing the points indicated by reference letters A in FIG. 11, with the center of the arc (indicated by reference letter B in FIG. 11) being located in a central portion of the rotating axle of the front wheels 4, 5. Broken lines C, D in FIG. 8 indicate the tangential positions. The point indicated by reference letter A is at the position of the screw 30a of the trailing arm 30 on the left side of the vehicle, which is the point at which the knuckle 24 intersects the shaft 17a of the motor 17. Likewise, on the right side of the vehicle, the point indicated by reference letter A is at the position at which the knuckle 36 intersects the shaft of the motor 18.

As the turn position signal is generated, the rear wheel steering angle controller 60 stops driving the motor 53 to stop the actuation of the hydraulic pump 52 (step S42), and generates a real wheel steering completion signal to the turn controller 70 (step S43). Also, the rear wheel steering angle controller 60 drives the lamp 49 to blink, has the buzzer 50 generate continuous sound (step S44), and set a rear wheel steering flag F equal to "1" (step S45). The rear wheel steering flag F is initially set to "0."

Upon determining at step S31 that the mode switch 61 is OFF, the rear wheel steering angle controller 60 determines whether or not the rear wheel steering flag F is "1" (step S46). If the rear wheel steering flag F is equal to "0," the operation of this routine is terminated. On the other hand, if the rear wheel steering flag F is equal to "1," the rear wheel steering angle controller 60 determines whether or not the vehicle turning speed is at 0 km/h (step S47). This is detected by a vehicle speed sensor 79. The vehicle speed sensor 79 may be any one which can detect that the rotations of the rear wheels 15, 16 are stopped. If the vehicle turning speed is not at 0 km/h, i.e., if the vehicle 1 is turning, the rear wheel steering angle controller 60 performs stop control for stopping the turning of the vehicle 1 (step S48). This stop control may involve supplying the motors 17, 18 with a brake signal, or braking the rotations of the rear wheels 15, 16 by bringing the brake caliper 35 into contact with the brake disk 33 for the left rear wheel and likewise bringing a brake caliper into contact with an associated brake disk, both not shown, for the right rear wheel.

If the vehicle is stopped with the turning speed at 0 km/h, the mode switch 61 has been turned OFF to recover the original straight traveling steering angle for the left and right wheels 15, 16, which have been controlled to be in the internally inclined attitude to have a steering angle suitable for turning, so that the rear wheel steering angle controller 60 has the sound source 77 generate a voice message (step S49). The voice message generated at step S49 may be a message for drawing attention of the driver such as "The rear wheels are returned," which is generated in the sound source 77 as an audio signal and output through the speaker 78. After executing step S49, the rear wheel steering angle controller 60 generates a turn stop instruction signal to the turn controller 70 (step S50), drives the motor 53 to operate the hydraulic pump 52 (step S51), and stops driving the solenoid 54a of the electromagnetic valve 54 in the excited state (step S52). In addition, the rear wheel steering angle controller 60 drives the lamp 49 to blink, and has the buzzer 50 generate intermittent sound (step S53). The execution of steps S51 and S52 causes the hydraulic pump 52 to discharge oil within the oil tank 51, and the internal paths of the electromagnetic valve 54 to be switched, so that the discharged oil is supplied to the oil chambers 41a, 42a of the respective hydraulic cylinders 41, 42 through the electromagnetic valve 54. On the other hand, the oil chambers 41b, 42b of the hydraulic cylinders 41, 42 communicate with the oil tank 51 through the electromagnetic valve 54 to return the oil within the oil chambers 41b, 42b to the oil tank 51 through the electromagnetic valve 54. Thus, the discharged oil from the oil tank 51 by the hydraulic pump 52 is supplied to the oil chambers 41a, 42a, thereby acting to increase the volumes of the oil chambers 41a, 42a to press the pistons 47, 48 toward the oil chambers 41b, 42b. The movements of the pistons 47, 48 toward the oil chambers 41b, 42b causes associated movements of the rods 43, 44 and the rims 45, 46 to the rear of the vehicle.

As the rim 45 moves toward the rear of the vehicle, the left and right knuckle arms 24b, 36b are pressed to the rear of the vehicle through the left and right connecting arms 32, 40, respectively, thus causing pivotal movements of the left and right rear wheels 15, 16 concerning the supporting shafts of the knuckles 24, 26 such that the wheels 15, 16 are oriented in the straight traveling direction of the vehicle. More specifically, the movement of the rim 45 causes pivotal movements of the rear tires 13, 14, the motors 17, 18, the knuckles 24, 36, and portions coupled to the rotating shafts 17a, 18a of the motors 17, 18 as well as the rear wheels 15, 16.

During the pivotal movements of the left and right wheels 15, 16, the lamp 49 is driven to blink, while the buzzer 50 generates intermittent alarming sound.

After executing step S53, the rear wheel steering angle controller 60 determines whether or not the straight traveling position signal has been generated (step S54). As the rim 46 moves to a position close to the hydraulic cylinders 41, 42, the rim sensor 63 generates the straight traveling position signal. When the straight traveling position signal is generated, the left and right rear wheels 15, 16 are generally returned to the original straight traveling attitude as illustrated in FIG. 11.

As the straight traveling position signal is generated, the rear wheel steering angle controller 60 stops driving the hydraulic pump 52 (step S55), stops the action of the shift lock mechanism 55 (step S56), stops driving the lamp 49 and the buzzer 50 (step S57), and sets the rear wheel steering flag F equal to "0" (step S58).

Figure 18:
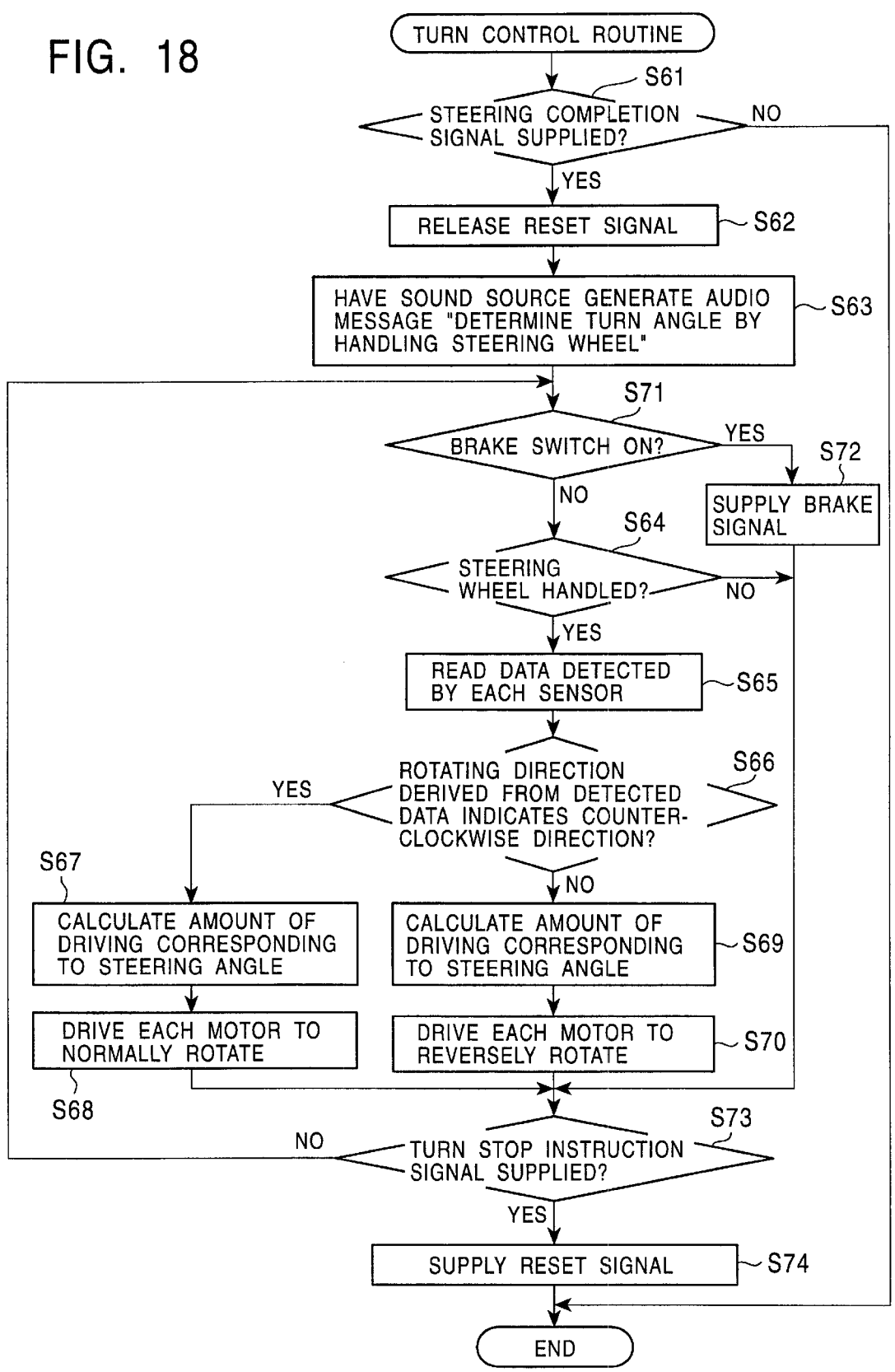
FIG. 18 is a flow chart illustrating a turn control routine.

Next, in the turn control routine illustrated in FIG. 18, the turn controller 70 first determines whether or not the rear wheel steering completion signal has been generated (step S61). As the rear wheel steering angle controller 60 has generated the steering completion signal at the aforementioned step S43, the steering completion signal is supplied to the turn controller 70.

Upon receipt of the steering completion signal, the turn controller 70 releases the reset signal (step S62). Since the motors 17, 18 are normally supplied with the reset signal from the turn controller 70 and therefore disabled to rotate, the reset signal supplied to the motors 17, 18 is stopped to bring the same into a motor operation waiting state. It should be noted that, after executing step S62, since the vehicle is in the turn mode in which the turn control is performed until the reset signal is generated at step S74, later described, the front wheels are not steered in response to a manipulation through the steering wheel 92.

After executing step S62, the turn controller 70 has the sound source 77 generate a voice message (step S63). The voice message generated at step S63 may be a message for prompting the driver to handle the steering wheel 92 such as "Determine a turn angle by handling the steering wheel," which is generated in the sound source 77 as an audio signal and output through the speaker 78.

After executing step S63, the turn controller 70 determines whether or not the brake switch 76 is ON (step S71). When the brake switch 76 is ON, the turn control routine proceeds to step S72, where the motors 17, 18 are supplied with a brake signal. The brake signal supplied to the motors 17, 18 causes the rotations of the motors 17, 18 to be braked.

Conversely, if the brake switch 76 is OFF, the turn controller 70 determines whether or not the steering wheel 92 was handled (step S64). When the steering wheel 92 was handled, the turn controller 70 reads data detected by the steering angle sensor 69 and the rotating direction sensor 89, respectively (step S65). Then, the turn controller 70 determines whether or not the steering wheel 92 has been rotated in the counter-clockwise direction (step S66). When the driver has rotated the steering wheel 92 in the counter-clockwise direction, the turn controller 70 acquires a steering angle from the data detected by the steering angle sensor 69 to calculate the amount of driving corresponding to the steering angle (step S67), and drives the motors 17, 18 to normally rotate by the calculated amount of driving (step S68). Conversely, if the driver has rotated the steering wheel 92 in the clockwise direction, rather than in the counter-clockwise direction, the turn controller 70 likewise acquires a steering angle from the data detected by the steering angle sensor 69 to calculate the amount of driving corresponding to the steering angle (step S69), and drives the motors 17, 18 to reversely rotate by the calculated amount of driving (step S70).

When the driver did not handle the steering wheel 92, the turn control routine proceeds to step S73, later described. When the operations at steps S64 to S72 indicate that the driver handled the steering wheel 92 in the counter-clockwise direction, the turn controller 70 supplies the motors 17, 18 with a normal/reverse rotation signal for specifying normal rotation, causing the motors 17, 18 to normally rotate in response to the normal/reverse rotation signal to drive the rear wheels 15, 16 to rotate, resulting in the vehicle turning counter-clockwise. The vehicle is turned counter-clockwise by an amount corresponding to a rotating angle (steering angle) from a reference angle (neutral position) of the steering wheel 92. On the other hand, when the driver handled the steering wheel 92 in the clockwise direction, the turn controller 70 supplies the motors 17, 18 with a normal/reverse rotation signal for specifying reverse rotation, causing the motors 17, 18 to reversely rotate in response to the normal/reverse rotation signal to drive the rear wheels 15, 16 to rotate, resulting in the vehicle turning clockwise. The vehicle is turned clockwise by an amount corresponding to a rotating angle (steering angle) from a reference angle (neutral position) of the steering wheel 92. The center on which the vehicle is turned to the left or to the right is positioned in a central portion of the rotating axle of the front wheels 4, 5, as mentioned above (indicated by reference letter B in FIG. 11). As the brake switch 76 is manipulated to turn ON, the turn controller 70 supplies the motors 17, 18 with a brake signal, to brake the rotation of the motors 17, 18.

Upon driving the motors 17, 18 to normally or reversely rotate, as described above, the turn controller 70 supplies a motor main signal to the relay unit 71. In the relay unit 71, the relay coil 81 is excited in response to the motor main signal to turn the relay switch 83 ON. The relay switch 83 thus turned ON lets a current flow from the positive terminal of the battery 86, through the fuse 85, the relay switch 83 and the motors 17, 18, into the negative terminal of the battery 86. In this way, the motors 17, 18 are applied with an output voltage of the battery 86 to produce normal rotation or reverse rotation thereof.

After executing step S68, S70 or S72, the turn controller 70 determines whether or not the turn stop instruction signal has been supplied thereto (step S73). As the mode switch 61 is manipulated to turn OFF to cause the rear wheel steering angle controller 60 to generate the turn stop instruction signal at the aforementioned step S42, the turn stop instruction signal is supplied to the turn controller 70. If no turn stop instruction signal is supplied, the turn controller 70 returns to step S71 to repeat the foregoing operations. On the other hand, the turn stop instruction signal, if supplied, terminates the turning operation of the vehicle, so that the turn controller 70 supplies the reset signal to the motors 17, 18 (step S74), followed by the termination of this routine. The reset signal supplied to the motors 17, 18 results in locking the motors 17, 18 which are thus set into a rotation disabled state.

For making a turn, the driver first shifts the transmission into the P position to allow a transition to the turn mode, and subsequently manipulates the mode switch 61 to turn ON. As a result, the vehicle is set into the turn mode, and if the left and right front wheels 4, 5 are not directed in the vehicle straight traveling direction, the turn controller 70 has the sound source 77 generate a message "Return the steering wheel to the neutral position" from the speaker 78, and drives the motor 110 of the steering mechanism to rotate, causing the left and right front wheels 4, 5 to start pivotal movements in the straight traveling direction. In other words, the left and right front wheels 4, 5 are driven to orient in the straight traveling direction without requiring the driver to handle the steering wheel 92.

With the left and right front wheels 4, 5 oriented in the vehicle straight traveling direction, the left and right rear wheels 15, 16, so far oriented in the vehicle straight traveling direction, start pivotal movements on vertical axes. During the pivotal movements, the lamp 49 blinks, and the buzzer 50 generates intermittent alarming sound. When the left and right rear wheels 15, 16 are brought into the internally inclined attitude as previously illustrated in FIG. 8, the lamp 49 is continuously lit, and the buzzer 50 generates continuous alarming sound. In addition, the turn controller 70 has the sound source 77 generate a message such as "Determine a turn angle by handling the steering wheel" from the speaker 78. The driver recognizes through the lit lamp 49 or the continuous alarming sound of the buzzer 50 and the message that a turning operation is enabled.

Then, as the driver rotates the steering wheel 92 in the counter-clockwise direction, the motors 17, 18 are normally rotated to cause normal rotations of the rear wheels 15, 16, resulting in turning the vehicle counter-clockwise. The amount by which vehicle is turned counter-clockwise is an angular distance corresponding to the angle of rotation of the steering wheel 92 in the counter-clockwise direction. On the other hand, as the driver rotates the steering wheel 92 in the clockwise direction, the motors 17, 18 are reversely rotated to cause reverse rotations of the rear wheels 15, 16, resulting in turning the vehicle counter-clockwise. The amount by which the vehicle is turned counter-clockwise is an angular distance corresponding to the angle of rotation of the steering wheel 92 in the clockwise direction. For stopping the turning operation, the driver manipulates the brake switch 76 to turn ON. In this way, the motors 17, 18 are braked to stop the rotations of the motors 17, 18, i.e., the rotations of the rear wheels 15, 16.

After the driver has made a desired turn, the driver manipulates the mode switch 61 to turn OFF. The mode switch 61, when turned OFF, causes the lamp 49 to blink, and the buzzer 50 to generate intermittent alarming sound. Then, the left and right rear wheels 15, 16 now in the internally inclined attitude start pivotal movements on the vertical axes so as to orient in the vehicle straight traveling direction. As the left and right rear wheels 15, 16 are returned to the original vehicle straight traveling direction, the lamp 49 stops blinking, and the buzzer 50 stops generating the intermittent alarming sound. The driver recognizes through the unlit lamp 49 or the stopped intermittent alarming sound from the buzzer 50 that the turn mode has been terminated to set the vehicle again into the normal mode.

As mentioned above, the amount by which the vehicle is turned to the left or to the right is an angular distance corresponding to an angle of rotation of the steering wheel 92. For this purpose, a driving time corresponding to an angle of rotation of the steering wheel 92 may be previously stored in a memory, such that a driving time can be set corresponding to an angle of rotation of the steering wheel 92 detected by the steering angle sensor 69 to apply the motors 17, 18 with an output voltage of the battery 86 for that driving time. Alternatively, a number of driving pulses may be generated corresponding to an angle of rotation of the steering wheel 92 and applied to the motors 17, 18 to turn the vehicle body 1 by an angular distance corresponding to the angle of rotation of the steering wheel 92. Further alternatively, an angular distance by which the vehicle body has actually turned may be detected by a sensor to drive the motors 17, 18 until the vehicle body turns by an angular distance corresponding to an angle of rotation of the steering wheel 92. It should be noted that the speed signal supplied to the motors 17, 18 when driving the motors 17, 18 is a signal for rotating the motors 17, 18 at a constant speed.

In the foregoing embodiment, the steering wheel 92 corresponds to a steering means, while the steering angle sensor 69 and the rotating direction sensor 89 correspond to a detecting means. The mode switch 61 corresponds to a mode selecting means. The aforementioned steering mechanism corresponds to a steering means. The feature for engaging the knuckle 24 with the trailing arm 30 constitutes a rotation supporting means which supports one of the left and right wheels rotatable concerning an axis perpendicular to the ground, and the rear wheel steering angle controller 60 executing steps S32 and S34 corresponds to a determining means for determining whether or not the vehicle operating state satisfies a predetermined condition. The feature composed of the hydraulic cylinders 41, 42, the rods 43, 44, the oil tank 51, the pump 52, the motor 53, the electromagnetic valve 54, the rims 45, 46, and the connecting arms 32, 40 constitute a rotating position fixing means. Also, the motors 17, 18 corresponds to turn driving means for applying rotating torques to one pair of the left and right wheels to turn the vehicle.

Since the foregoing embodiment has been described for a vehicle equipped with an automatic transmission, step S32 determines whether or not the shift position of the transmission lies in the P position. For a vehicle equipped with a manual transmission, step S32 may determine whether or not the shift position lies in a neutral position or whether or not a side brake has been actuated. Alternatively, step S32 may determine whether the shift position lies in the P position or the neutral position and whether or not the side brake is being operated. By detecting that the shift position of the transmission of the vehicle lies in the P position or the N position, or that the side brake is being operated for determining that the vehicle stops running, it is possible to detect that the vehicle is not merely temporarily stopped, thereby preventing the vehicle from running forward or backward during a turning operation.

Further, since the foregoing embodiment has been described for a front wheel drive vehicle, the rear wheels are pivoted into the internally inclined attitude in the turn mode. For a rear wheel drive vehicle, on the other hand, front wheels are pivoted into a similar internally inclined attitude. In the latter case, the front wheels are fixed at predetermined angular positions along tangential directions of an arc having the center located in a central portion of the rotating axle between the rear wheels.

Also, while in the foregoing embodiment, each of the rear wheels is provided with the separate motor 17 or 18, the motors may be formed in the respective rear wheels.

Figure 19:
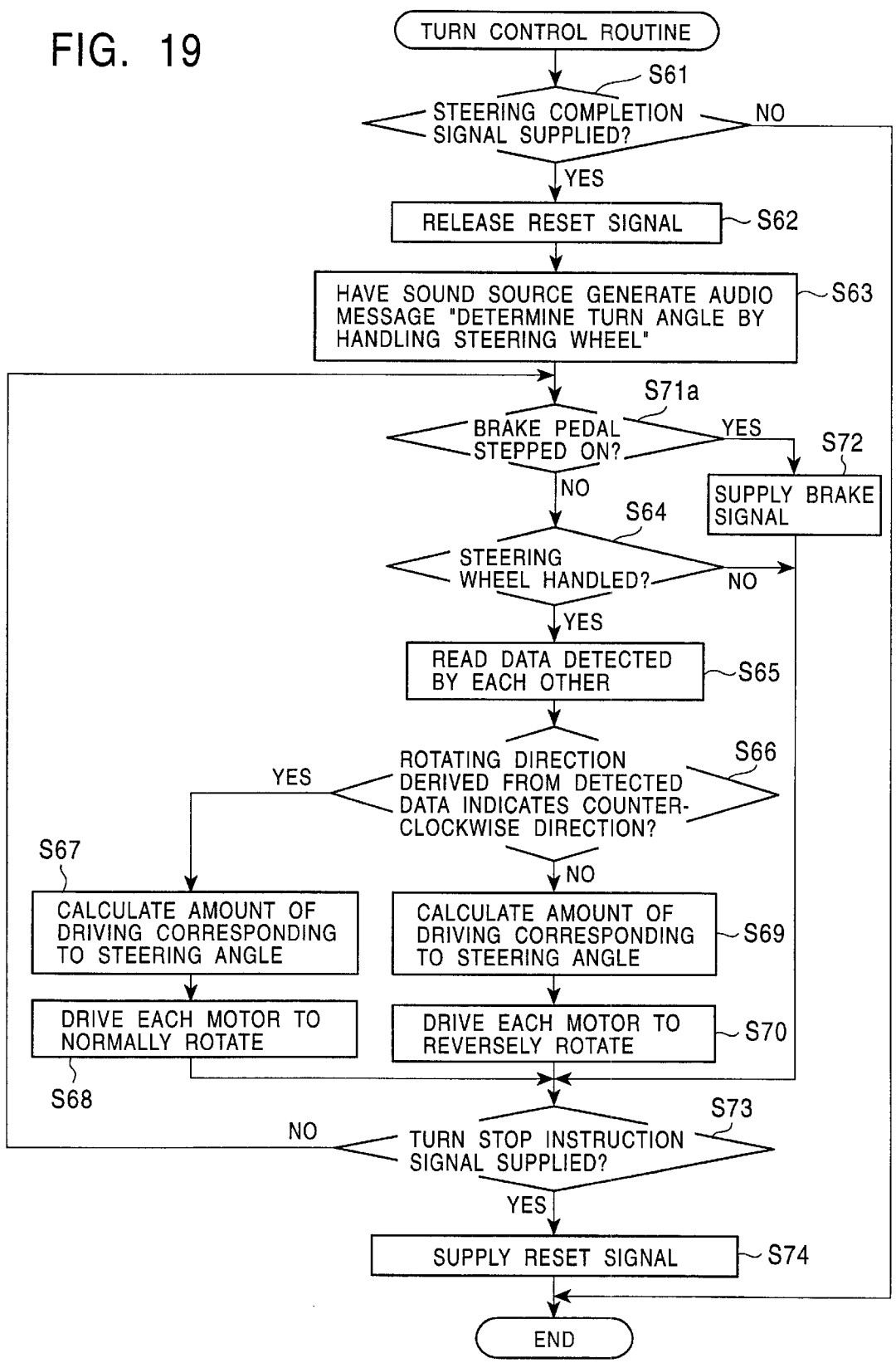
FIG. 19 is a flow chart illustrating another example of a rear wheel steering routine.

Furthermore, in the foregoing embodiment, the braking is applied during a turning operation in response to a manipulation on the brake switch 76 arranged integral with the steering wheel 92. Alternatively, the braking may be applied during a turning operation in response to the driver stepping on the brake pedal. In the latter case, as illustrated in FIG. 19, the turn controller 70 determines whether or not the driver has stepped on the brake pedal (step S71*a*), and the turn control routine proceeds to step S72, when the driver has stepped on the brake pedal, to brake the rotations of the motors 17, 18.

Furthermore, the motors 17, 18 may be applied with a slight current when the driver is stepping on the brake pedal in order to stop turning the vehicle. This application of a slight current is performed for implementing subtle braking by means of the brake pedal by applying a torque such as a creep torque of an automatic transmission during the turn stopping control.

Figure 20:
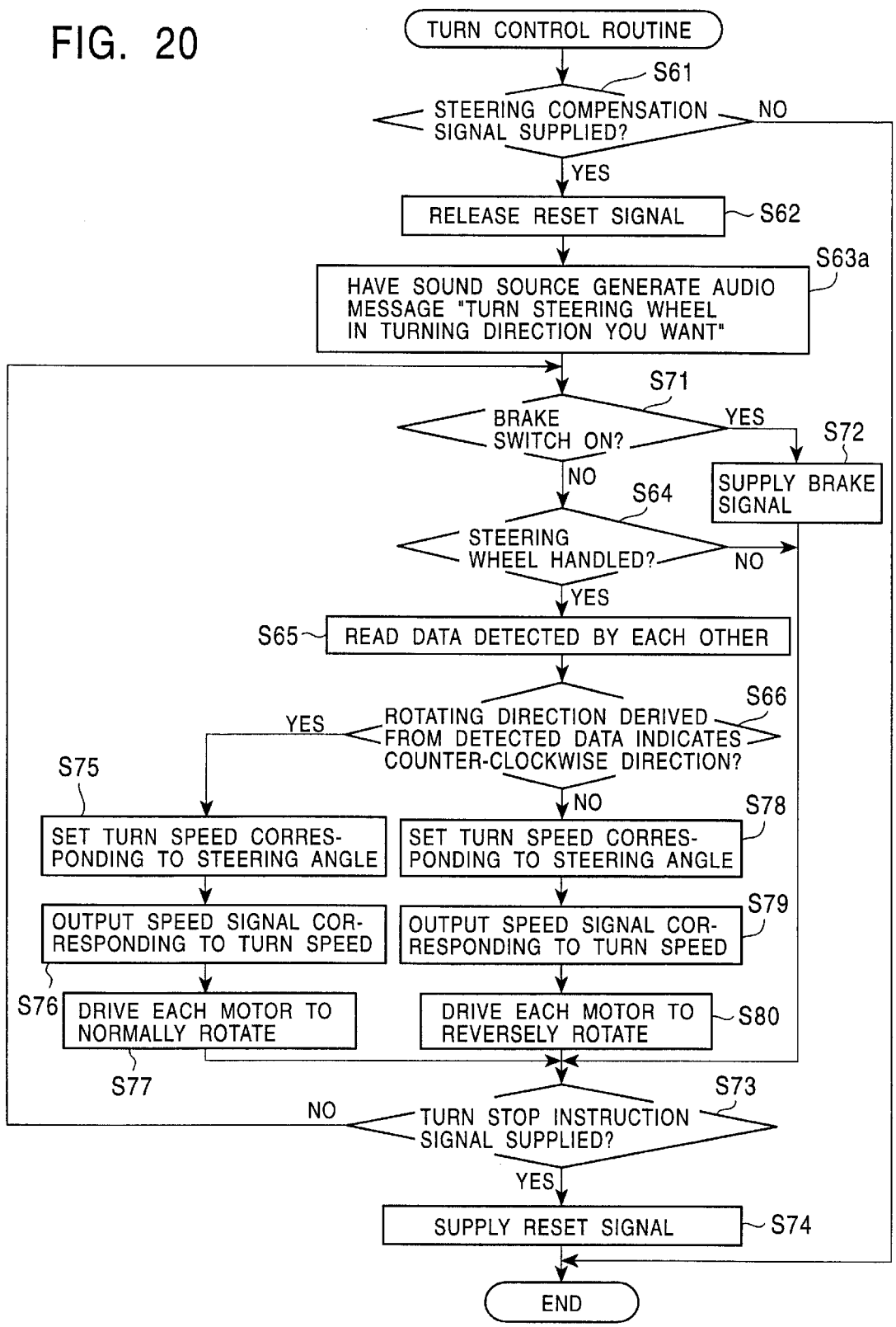
FIG. 20 is a flow chart illustrating another example of a turn control routine.

Also, while in the foregoing embodiment, the vehicle body is turned by an angular distance corresponding to an angle of rotation of the steering wheel 92, the vehicle body may be turned at a speed corresponding to an angle of rotation of the steering wheel 92. In the latter case, as illustrated in FIG. 20, the turn controller 70 may have the sound source 77 generate a voice message such as "Turn the steering wheel in a direction in which you want the vehicle to turn" (step S63*a*). When determining at step S66 that the driver rotates the steering wheel 92 in the counter-clockwise direction, the turn controller 70 acquires a steering angle from data detected by the steering angle sensor 69, and sets a turning speed corresponding to the steering angle (step S75), outputs a speed signal indicative of the turning speed (step S76), and drives the motors 17, 18 to normally rotate (step S77). Conversely, when the driver rotates the steering wheel 92 in the clockwise direction rather than in the counter-clockwise direction, the turn controller 70 likewise acquires a steering angle from a reference angle from data detected by the steering angle sensor 69, sets a turning speed corresponding to the steering angle (step S78), outputs a speed signal indicative of the turning speed (step S79), and drives the motors 17, 18 to reversely rotate (step S80).

The turning speed has been previously stored in a memory, not shown, as a table, such that the turning speed is higher as the steering angle is larger, so that the turning speed is determined at steps S75 and S78 using this table.

The speed signal is supplied from the turn controller 70 to the motors 17, 18 through a speed adjusting volume 72, and the motors 17, 18 are responsively rotated at a speed indicated by the speed signal to rotate the rear wheels 15, 16. Thus, as the driver rotates the steering wheel 92 in the counter-clockwise direction, the motors 17, 18 are normally rotated to normally rotate the rear wheels 15, 16, resulting in turning the vehicle counter-clockwise. The speed at which the vehicle is turned counter-clockwise corresponds to a steering angle of the steering wheel 92. On the other hand, as the driver rotates the steering wheel 92 in the clockwise direction, the motors 17, 18 are reversely rotated to reversely rotate the rear wheels 15, 16, resulting in turning the vehicle clockwise. The speed at which the vehicle is turned clockwise corresponds to a steering angle of the steering wheel 92.

Further, in the foregoing embodiment, the rear wheels 15, 16 are driven by the motors 17, 18, used as driving sources, for rotation to turn the vehicle body 1. Alternatively, the front wheels 4, 5, which are applied with a running torque by the engine body 2 in the normal mode, may be applied with rotating torques in rotating directions different from each other to turn the vehicle body 1 in the turn mode. In the following, description will be made on a four-wheel vehicle which applies the front wheels 4, 5 respectively with rotating torques in rotating directions different from each other to turn the vehicle body 1.

Figure 21:
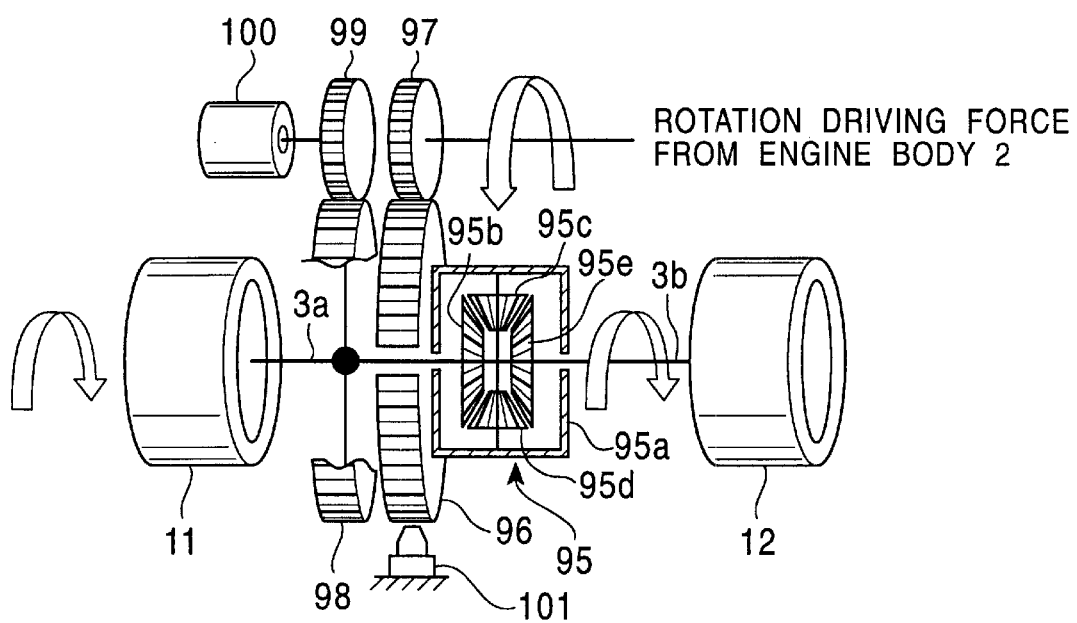
FIG. 21 is a diagram generally illustrating a front wheel driving mechanism.

As illustrated in FIG. 21, the aforementioned driving axle 3 is composed of driving axles 3*a*, 3*b* which are provided with a differential 95. A ring gear 96 fixed to the case 95*a* of the differential 95 meshes with a driving gear 97 which is driven by an engine body 2 to rotate. A stopper 101 is engageable with teeth of the ring gear 96 by a mechanism, not shown, such that the rotation of the ring gear 96 is forcedly stopped when the stopper 101 engages with the ring gear 96. The stopper 101 is driven by a stopper driving unit 102, illustrated in FIG. 22 later described, to engage with the ring gear 96.

A gear 98 is also attached to the driving axle 3*a* so as to rotate with the driving axle 3*a*. The gear 98 meshes with the driving gear 99. The driving gear 99 is driven by a motor 100 to rotate. The motor 100, which serves as a driving source for turning the vehicle body 1, is normally rotated for turning the vehicle body 1 counter-clockwise, and is reversely rotated for turning the vehicle body 1 clockwise.

It should be noted that because each of the rear wheels 15, 16 is not applied with a rotating torque in the turn mode, the motors 17, 18 illustrated in FIG. 11 are not provided.

Figure 22:
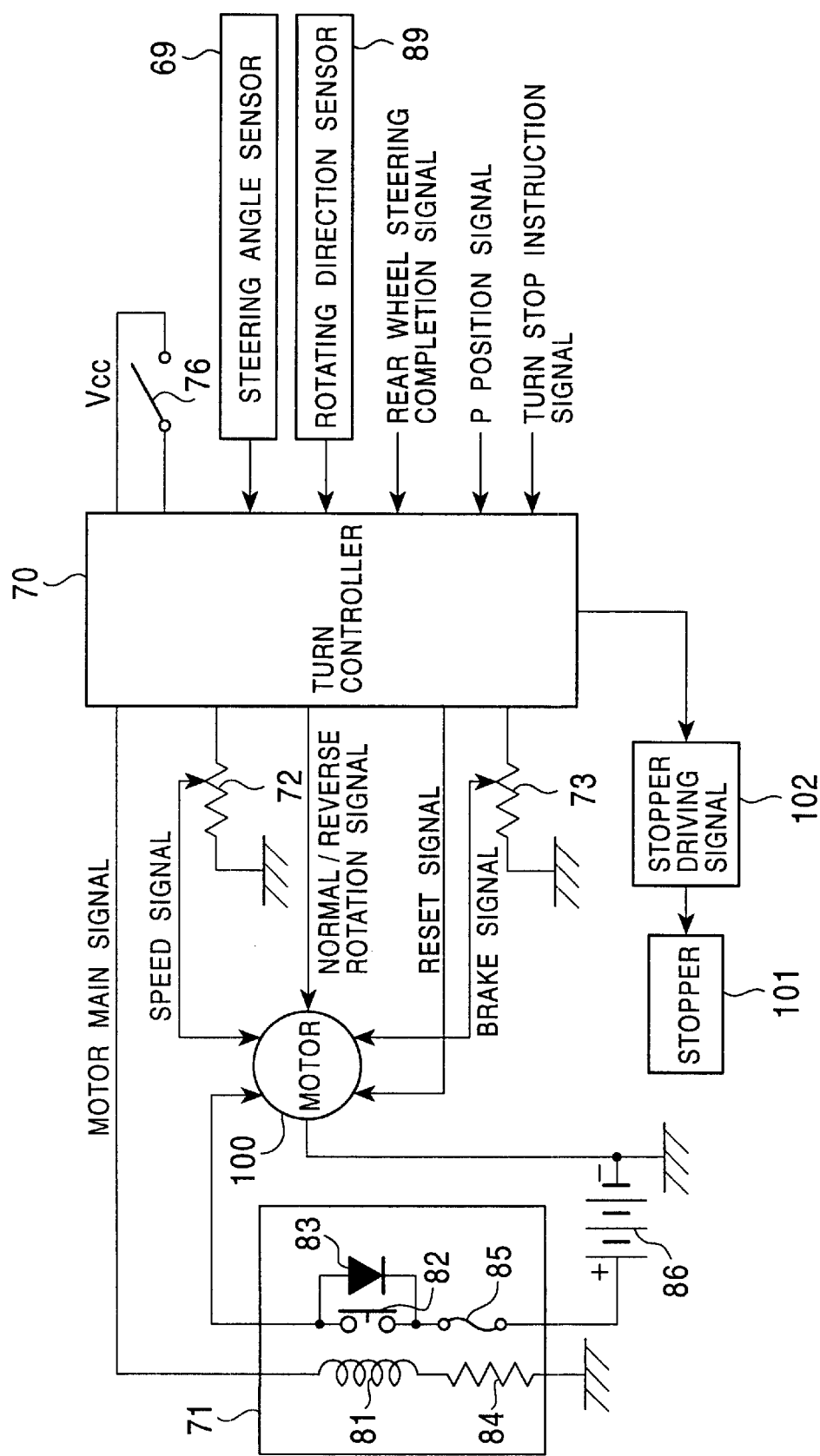
FIG. 22 is a circuit diagram illustrating a driving control system.
Figure 23:
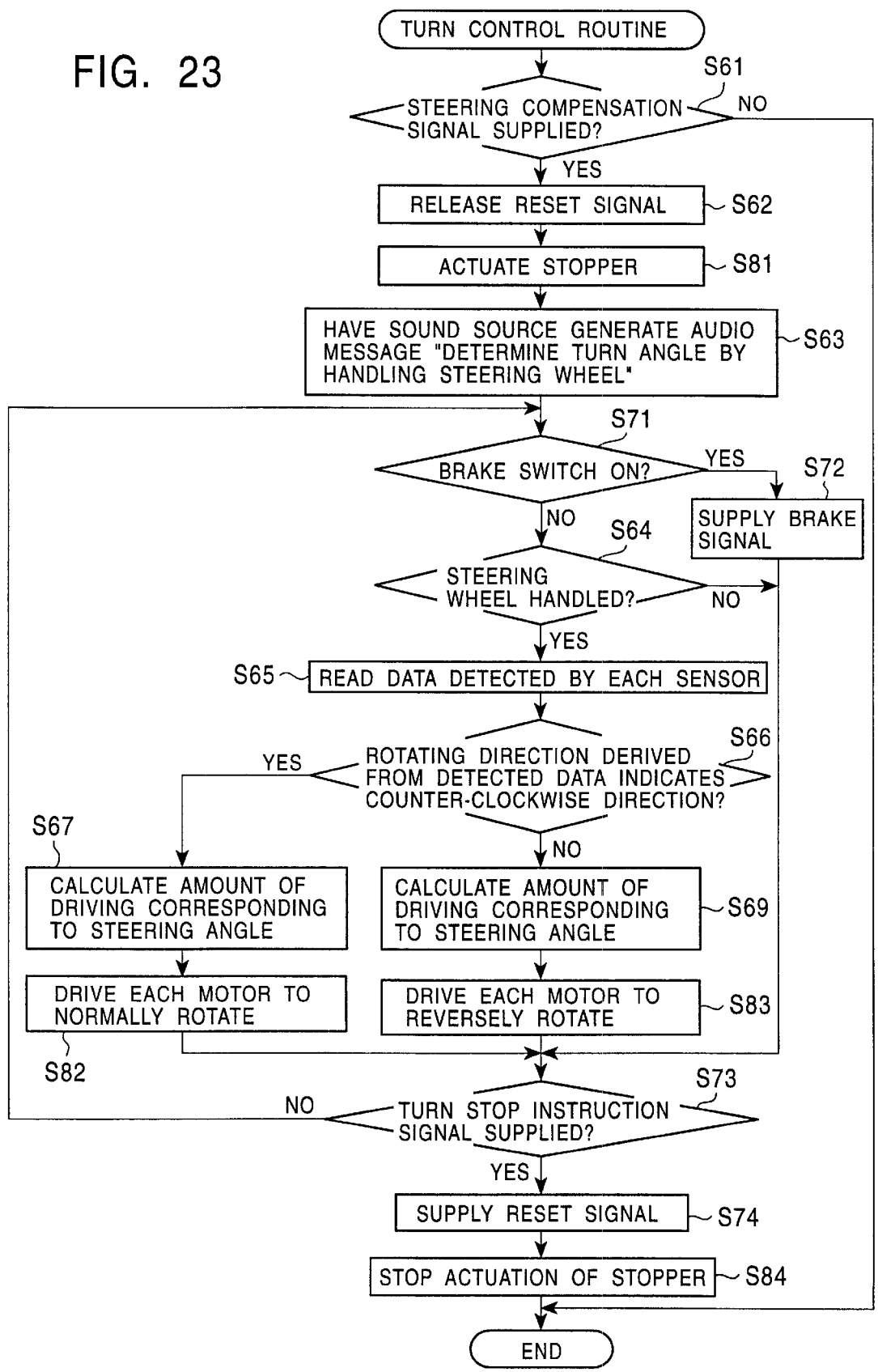
FIG. 23 is a flow chart illustrating another example of a turn control routine.

The turn controller 70 executes a turn control routine which however differs from the turn control routine illustrated in FIG. 18 in that it controls the driving of the motor 100 as well as the stopper 101. The turn controller 70 is connected to the stopper 101 through a stopper driving unit 102, as illustrated in FIG. 22. In the turn control routine illustrated in FIG. 23, as a steering completion signal is supplied, the turn controller 70 releases the reset signal at step S62, and then actuates the stopper 101 through the stopper driving unit 102 (step S81). The motor 100 is normally supplied with the reset signal from the turn controller 70 and therefore disabled to rotate, so that the reset signal supplied to the motor 100 is stopped to bring the motor 100 into a motor operation waiting state. Also, the stopper 101, when actuated, engages with the ring gear 96 to be fixed together with the case 95*a* so as to prevent the ring gear 96 from rotating.

When determining at step S66 that the driver rotates the steering wheel 92 in the counter-clockwise direction, the turn controller 70 acquires a steering angle from data detected by the steering angle sensor 69 to calculate the amount of driving corresponding to the steering angle (step S67), and drives the motor 100 to normally rotate by the calculated amount of driving (step S82). Conversely, when the driver rotates the steering wheel 92 in the clockwise direction rather than in the counter-clockwise direction, the turn controller 70 likewise acquires a steering angle from data detected by the steering angle sensor 69 to calculate the amount of driving corresponding to the steering angle (step S69), and drives the motor 100 to reversely rotate by the calculated amount of driving (step S83). When determining at step S71 that the brake switch 76 is ON, the turn control routine proceeds to step S72, where the turn controller 70 supplies the motor 100 with a brake signal.

Figure 24:
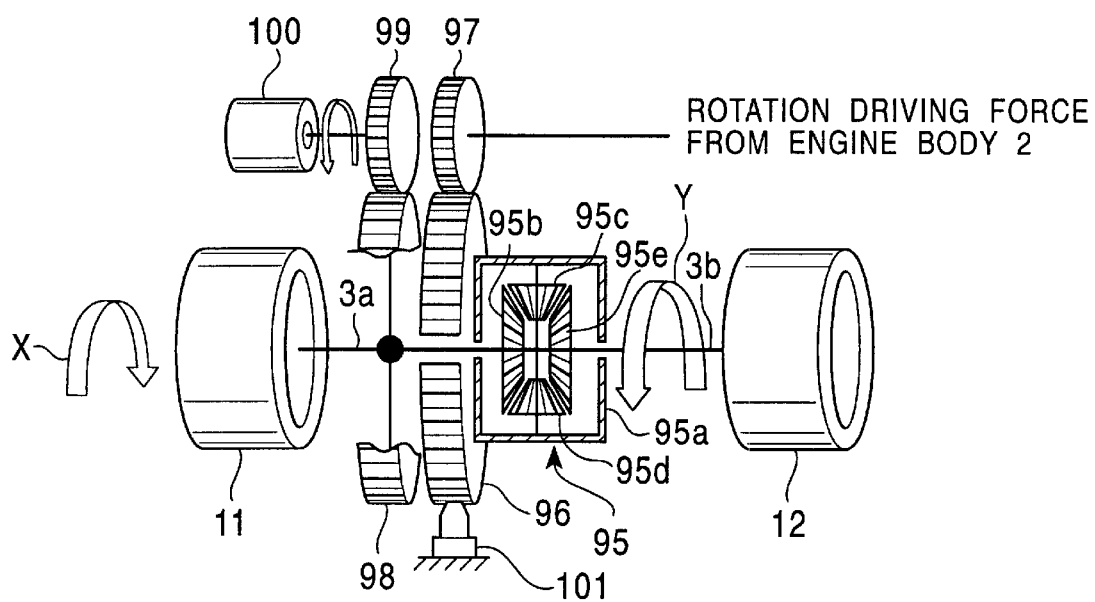
FIG. 24 is a diagram generally illustrating the state of the front wheel driving mechanism during a turning operation

Thus, when the driver rotates the steering wheel 92 in the counter-clockwise direction, the operations at the foregoing steps allows the turn controller 70 to supply the motor 100 with a normal/reverse rotation signal for specifying normal rotation, causing the motor 100 to normally rotate in response to the normal/reverse rotation signal. Since the normal rotation of the motor 100 is transmitted to the driving axle 3*a* through the driving gear 99 and the gear 98, the driving axle 3a is rotated to rotate the left front wheel 4 as indicated by an arrow X in FIG. 24. In addition, the rotation of the driving axle 3a causes one side gear 95b within the differential 95 to rotate. The rotation of the side gear 95b is transmitted to the other side gear 95e after converted to reverse rotation by two pinions 95c, 95d. In this way, the other side gear 95e reversely rotates the right wheel 5 through the driving axle 3b as indicated by an arrow Y in FIG. 24 in the direction opposite to the rotating direction of the left wheel 4. Thus, the left front wheel 4 is rotated in the direction in which the vehicle goes forward, while the right front wheel 5 is rotated in the direction in which the vehicle goes backward, so that the vehicle body 1 turns to left on the center which is located in a central portion of the rotating axle of the front wheels 4, 5 (indicated by reference letter B in FIG. 11), causing the rotatable rear wheels 15, 16 to rotate pursuant to the vehicle body turning to the left.

Conversely, as the driver rotates the steering wheel 92 in the clockwise direction, the turn controller 70 supplies the motor 100 with a normal/reverse rotation signal for specifying reverse rotation, causing the motor 100 to reversely rotate in response to the normal/reverse rotation signal. Since the reverse rotation of the motor 100 is transmitted to the driving axle 3a through the driving gear 99 and the gear 98, the driving axle 3a is rotated to rotate the left front wheel 4 in the direction reverse to that indicated by the arrow X in FIG. 24. In addition, the rotation of the driving axle 3a causes one side gear 95b within the differential 95 to rotate. The rotation of the side gear 95b is transmitted to the other side gear 95e after converted to reverse rotation by the two pinions 95c, 95d. In this way, the other side gear 95e rotates the right wheel 5 through the driving axle 3b in the direction reverse to that indicated by the arrow Y in FIG. 24. Thus, the left front wheel 4 is rotated in the direction in which the vehicle goes backward, while the right front wheel 5 is rotated in the direction in which the vehicle goes forward, so that the vehicle body 1 turns to the right on the center which is located in a central portion of the rotating axle of the front wheels 4, 5 (indicated by reference letter B in FIG. 11), causing the rotatable rear wheels 15, 16 to rotate pursuant to the vehicle body turning to the right.

As the brake switch 76 is manipulated to turn ON, the turn controller 70 supplies the motor 100 with a brake signal, to brake the rotation of the motor 100.

Upon driving the motor 100 to normally or reversely rotate as described above, the turn controller 70 supplies a motor main signal to the relay unit 71. In the relay unit 71, the relay coil 81 is excited in response to the motor main signal to turn the relay switch 83 ON. The relay switch 83 thus turned ON lets a current flow from the positive terminal of the battery 86, through the fuse 85, the relay switch 83 and the motor 100, into the negative terminal of the battery 86. In this way, the motor 100 is applied with an output voltage of the battery 86 to produce normal rotation or reverse rotation thereof.

After executing step S82, S83 or S72, the turn controller 70 determines whether or not the turn stop instruction signal has been supplied thereto (step S73). As the mode switch 61 is manipulated to turn OFF to cause the rear wheel steering angle controller 60 to generate the turn stop instruction signal at the aforementioned step S42, the turn stop instruction signal is supplied to the turn controller 70. If no turn stop instruction signal is supplied, the turn controller 70 returns to step S84 to repeat the foregoing operations. On the other hand, the turn stop instruction signal, if supplied, terminates the turning operation of the vehicle, so that the turn controller 70 supplies the reset signal to the motor 100 (step S74), and stops the actuation of the stopper 101 by means of the stopper driving unit 102 (step S84), followed by the termination of this routine. The reset signal supplied to the motor 100 results in locking the motors 100 which is thus set into a rotation disabled state. In addition, as the stopper 101 is stopped operating, the ring gear 96 is released from the engagement with the stopper 101, so that the ring gear 96 is made rotatable with the case 95a by the rotation of the driving gear 97.

While in the foregoing respective embodiments, the left and right wheels are simultaneously pushed by way of a pair of cylinders, the left and right wheels may be individually driven, or may be applied with a driving force in a lateral direction of the vehicle. For example, the left and right knuckle arms 24b, 36b may be directly pushed without intervention of the rim 45 and the arms 32, 40, respectively. Further alternatively, the driving force may be applied in a variety of ways such as by use of a differential rack.

As described above, according to the four-wheel vehicle of the present invention, the vehicle body is turned on a point near the center point of the rotating axle of the front or rear left and right wheels of the vehicle, thereby making it possible to turn the vehicle body with a relatively small turning radius. In addition, the steering means such as the steering wheel for use in the normal mode for running the vehicle is also used in the turn mode to perform the turning operation, the operability can be improved during the turning operation. Furthermore, the utilization of the steering means for the turning operation can reduce the cost as compared with a manipulating device such as a switch which would be newly provided for the turning operation.

What is claimed is:

1. A four-wheel vehicle equipped with a turning mechanism, comprising:

a vehicle driving source for transmitting running torque to only one of the front and rear pairs of left and right wheels;

rotatably supporting means for supporting the other of front and rear pairs of left and right wheels to which a running torque produced by said vehicle driving source is not transmitted, for rotation concerning respective axes perpendicular to the ground;

rotating position fixing means for fixing only the other pair of left and right wheels at respective angular positions along tangential directions of an arc passing said respective axes perpendicular to the ground of said one pair of left and right wheels, said arc having the center located near a center point of a rotating axle for running said vehicle of the one of the front and rear pairs of left and right wheels; and turn driving means for applying a rotating torque only to said other pair of left and right wheels at the angular positions fixed by said rotating position fixing means to turn a vehicle body substantially about the center point of the rotating axle for running said vehicle of the one pair of left and right wheels, which are neither rotated nor driven during the turn.

2. A four-wheel vehicle equipped with a turning mechanism according to claim 1, further comprising driving means for turning said other pair of left and right wheels on the respective axes perpendicular to the ground between straight traveling positions taken when said vehicle is running and said angular positions along the tangential direction, the turning of each of said other pair of left and right wheels being opposite each other in direction.

3. A four-wheel vehicle equipped with a turning mechanism according to claim 1, wherein said turn driving means applies said rotating torque to said other pair of left and right wheels with another driving source different from said vehicle driving source to turn said vehicle body.

4. A four-wheel vehicle equipped with a turning mechanism, comprising:
   a vehicle driving source transmitting running torque to one of the front and rear pairs of left and right wheels;
   rotatably supporting means for supporting the other of front and rear pairs of left and right wheels to which a running torque produced by said vehicle driving source is not transmitted, for rotation concerning respective axes perpendicular to the ground;
   rotating position fixing means for fixing the other pair of left and right wheels at respective angular positions along tangential directions of an arc passing said respective axes perpendicular to the ground of said one pair of left and right wheels, said arc having the center located near a center point of a rotating axle for running said vehicle of the one of the front and rear pairs of left and right wheels; and
   turn driving means for applying a rotating torque to said other pair of left and right wheels at the angular positions fixed by said rotating position fixing means to turn a vehicle body substantially about the center point of the rotating axle for running said vehicle of the one pair of left and right wheels,
   wherein said rotatably supporting means includes a trailing arm for rotatably supporting said other pair of left and right wheels through knuckles at said respective axes perpendicular to the ground of said other pair of left and right wheels.

5. A vehicle equipped with a turning mechanism comprising:
   steering means rotatably arranged for steering said vehicle;
   detecting means for detecting a manipulating state of said steering means;
   mode selecting means for selecting one of a normal mode for running said vehicle and a turn mode for turning a vehicle body while said vehicle stops running;
   steering control means for changing a steering angle of a steering wheel of said vehicle in accordance with a result of detection by said detecting means when said mode selecting means selects said normal mode; and
   turning means for turning a vehicle body substantially about the center point of an axle extending between a front or rear pair of left and right wheels of said vehicle in response to a result of detection by said detecting means, without allowing said steering control means to change the steering angle of said steering wheel in accordance with a result of detection by said detecting means when said mode selecting means selects said turn mode, wherein both pairs of front and rear wheels remain in contact with the ground throughout the turn.

6. A vehicle equipped with a turning mechanism according to claim 5, wherein said turning means includes:
   rotatably supporting means for supporting one of front and rear pairs of left and right wheels to which a running torque produced by a vehicle driving source is not transmitted, for rotation concerning respective axes perpendicular to the ground;
   determining means for determining whether a vehicle operating state satisfies predetermined conditions when said turn mode is selected;
   rotation driving means, when said determining means determines that said predetermined conditions are satisfied, for rotating the one pair of left and right wheels from straight travelling positions taken when said vehicle is running to respective angular positions along tangential directions of an arc passing said respective axes perpendicular to the ground of said one pair of left and right wheels, said arc having the center located near a center point of a rotating axle of the other of th front and rear pairs of left and right wheels; and
   turn driving means for applying a rotating torque to said one pair of left and right wheels at the angular positions along said tangential direction in accordance with a result of detection by said detecting means to turn the vehicle body substantially about the center point of the rotating axle of the other pair of left and right wheels.

7. A vehicle equipped with a turning mechanism according to claim 6,
   wherein said detecting means detects a rotating direction and a rotating angle of said steering means from a reference angle; and
   wherein said turn driving means turns said vehicle body over an angular distance corresponding to said rotating direction and said rotating angle detected by said detecting means.

8. A vehicle equipped with a turning mechanism according to claim 6,
   wherein said detecting means detects a rotating direction and a rotating angle of said steering means from a reference angle; and
   wherein said turn driving means turns said vehicle body at a speed corresponding to said rotating direction and said rotating angle detected by said detecting means.

9. A vehicle equipped with a turning mechanism according to claim 6, wherein said predetermined conditions include at least the following conditions:
   (a) said vehicle stops running; and
   (b) the steering angle of front wheels is substantially zero degrees.

10. A vehicle equipped with a turning mechanism according to claim 9, wherein said condition defining that said vehicle stops running is detected from:
    a shift position of a transmission equipped in said vehicle lying in a P (parking) position or an N (neutral) position; or
    a side brake being in operation.

11. A vehicle equipped with a turning mechanism according to claim 6, further comprising a shift lock mechanism for disabling a transmission to perform a shifting operation when at least said one pair of left and right wheels are at positions other than said straight traveling positions.

12. A vehicle equipped with a turning mechanism according to claim 6, wherein said turn driving means applies said rotating torque to said one pair of left and right wheels with a driving source different from said vehicle driving source to turn said vehicle body.

13. A vehicle equipped with a turning mechanism according to claim 6, wherein said rotatably supporting means includes a trailing arm for rotatably supporting said one pair of left and right wheels through knuckles at said respective axes perpendicular to the ground of said one pair of left and right wheels.

14. A vehicle equipped with a turning mechanism according to claim 6, wherein said turn driving means includes braking means for applying a braking force to rotations of said one pair of left and right wheels in response to a manipulation on a switch arranged in a steering wheel.

15. A vehicle equipped with a turning mechanism according to claim 6, wherein said turn driving means includes braking means for applying a braking force to rotations of said one pair of left and right wheels in response to stepping on a brake pedal.

16. A vehicle equipped with a turning mechanism according to claim 5, wherein said turning driving means includes:

rotatably supporting means for supporting one of front and rear pairs of left and right wheels to which a running torque produced by a vehicle driving source is not transmitted, for rotation concerning respective axes perpendicular to the ground;

determining means for determining whether or not a vehicle operating state satisfies predetermined conditions when said turn mode is selected;

rotation driving means, when said determining means determines that said predetermined conditions are satisfied, for rotating said one pair of left and right wheels from straight traveling positions taken when said vehicle is turning to respective angular positions along tangential directions of an arc passing said axes perpendicular to the ground of said one pair of left and right wheels, said arc having the center located near a center point of a rotating axle of the other of the front and rear pairs of left and right wheels; and turn driving means for applying rotating torques in rotating directions different from each other to the left and right wheels of the other pair of the angular oppositions along said tangential directions in accordance with a result of detection by said detecting means to turn the vehicle body substantially about the center point of the rotating axle of said other pair of left and right wheels.

17. A vehicle equipped with a turning mechanism according to claim 16, wherein said turn driving means applies the rotating torques in rotating directions different from each other to the respective left and right wheels of said other pair with a driving source different from said vehicle driving source to turn the vehicle body.

18. A vehicle equipped with a turning mechanism according to claim 16, wherein said turn driving means comprises:

means for fixing a case for rotatably supporting two pinions arranged in a differential during a turning operation of said vehicle body; and a motor for driving one of side gears arranged in said differential to rotate.

* * * * *